US008881586B2

(12) United States Patent
Rothstein et al.

(10) Patent No.: US 8,881,586 B2
(45) Date of Patent: Nov. 11, 2014

(54) TIRE-CONDITION-ASCERTAINING CARTRIDGE

(71) Applicant: Mobile Awareness, LLC, Solon, OH (US)

(72) Inventors: Gary Steven Rothstein, Orange Village, OH (US); Michael James Keller, Tallmadge, OH (US)

(73) Assignee: Mobile Awareness, LLC, Solon, OH (US)

( * ) Notice: Subject to any disclaimer, the term of this patent is extended or adjusted under 35 U.S.C. 154(b) by 76 days.

(21) Appl. No.: 13/662,285

(22) Filed: Oct. 26, 2012

(65) Prior Publication Data
US 2014/0116126 A1 May 1, 2014

(51) Int. Cl.
G01M 17/02 (2006.01)
B60C 23/04 (2006.01)

(52) U.S. Cl.
CPC ......... B60C 23/0408 (2013.01); *B60C 23/0444* (2013.01); *B60C 23/0496* (2013.01)
USPC .......................................................... 73/146

(58) Field of Classification Search
USPC ................................................. 73/146–146.8
See application file for complete search history.

(56) References Cited

U.S. PATENT DOCUMENTS

| | | | |
|---|---|---|---|
| 4,359,896 A * | 11/1982 | Brown et al. ................... 73/146 |
| 4,409,586 A | 10/1983 | Hochstein |
| 4,646,673 A | 3/1987 | Fordyce |
| 5,663,496 A | 9/1997 | Handfield et al. |
| 5,992,227 A * | 11/1999 | Jellison et al. ................... 73/146 |
| 6,580,363 B1 | 6/2003 | Wilson |
| 6,655,203 B2 | 12/2003 | Hsu |
| 6,694,807 B2 | 2/2004 | Chuang et al. |
| 6,799,455 B1 | 10/2004 | Neefeldt et al. |
| 6,805,000 B1 | 10/2004 | Sheikh-Bahaie |
| 7,086,412 B2 | 8/2006 | Uleski |
| 7,168,305 B2 | 1/2007 | Narayanaswamy |
| 7,242,284 B2 | 7/2007 | Taguchi |
| 7,246,518 B2 | 7/2007 | Ito et al. |
| 7,254,997 B1 | 8/2007 | Hui |
| 7,278,306 B2 | 10/2007 | Baum |
| 7,281,421 B2 | 10/2007 | Yin et al. |
| 7,350,407 B2 | 4/2008 | Shimura |
| 7,421,902 B2 | 9/2008 | Sheikh-Bahaie et al. |
| 7,441,452 B2 | 10/2008 | Phalak et al. |
| 7,469,581 B2 | 12/2008 | Katou et al. |
| 7,509,849 B2 | 3/2009 | Rutherford et al. |
| 7,509,850 B1 | 3/2009 | Hui |
| 7,516,653 B2 | 4/2009 | Blossfeld |
| 7,656,281 B2 | 2/2010 | Zhou |
| 7,669,466 B2 | 3/2010 | Ray et al. |
| 7,764,168 B1 | 7/2010 | Huang |
| 7,779,682 B2 * | 8/2010 | Kurtz et al. ................... 73/146.8 |
| 7,944,346 B2 | 5/2011 | De Castro et al. |
| 7,963,159 B2 * | 6/2011 | Ingram et al. ................. 73/146.3 |
| 8,028,732 B1 * | 10/2011 | Ingram et al. ................. 152/417 |

(Continued)

Primary Examiner — Andre Allen
(74) Attorney, Agent, or Firm — Cooper Legal Group, LLC

(57) ABSTRACT

A tire-condition-ascertaining cartridge (100) comprising a scaffoyer structure which performs both scaffolding and fluid-foyer-forming functions. The scaffoyer (600) includes planks and/or derricks which properly posture a first fitting (200), a second fitting (300), an electronics assembly (400), and a power source (500) during cartridge construction. The scaffoyer (600) also forms a fluid foyer to the sensing site and this foyer can be tested for fluid integrity (e.g., leaks) prior to creating the housing capsule (800).

20 Claims, 40 Drawing Sheets

(56) References Cited

U.S. PATENT DOCUMENTS

| | | |
|---|---|---|
| 8,307,869 B2 * | 11/2012 | Medley et al. ............... 152/428 |
| 2002/0061758 A1 | 5/2002 | Zarlengo et al. |
| 2004/0046649 A1 | 3/2004 | Sanchez |
| 2004/0095227 A1 | 5/2004 | Lehman |
| 2007/0069877 A1 | 3/2007 | Fogelstrom |
| 2007/0193348 A1 * | 8/2007 | Rutherford et al. .......... 73/146.8 |
| 2007/0193349 A1 * | 8/2007 | Petrucelli .................... 73/146.8 |
| 2008/0042817 A1 | 2/2008 | Fogelstrom |
| 2008/0094197 A1 | 4/2008 | Huang |
| 2008/0106394 A1 | 5/2008 | Huang |
| 2008/0143593 A1 | 6/2008 | Graziano et al. |
| 2008/0302425 A1 | 12/2008 | Hettle et al. |
| 2009/0195373 A1 | 8/2009 | Lettieri et al. |
| 2009/0241655 A1 * | 10/2009 | Ingram et al. ............... 73/146.3 |
| 2010/0043542 A1 | 2/2010 | Yang |
| 2011/0014954 A1 | 1/2011 | Dossas |
| 2011/0148592 A1 | 6/2011 | Benedict et al. |
| 2011/0148593 A1 | 6/2011 | Benedict et al. |

* cited by examiner

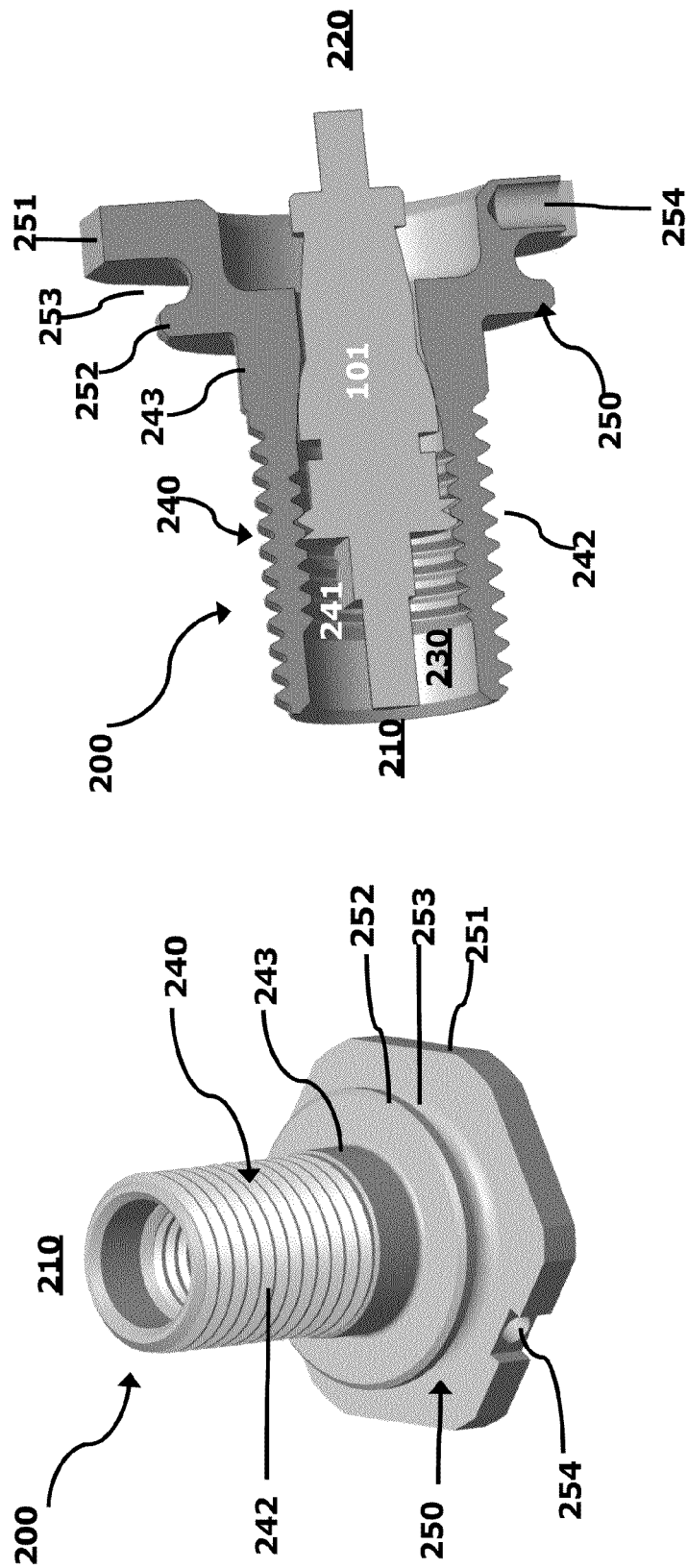

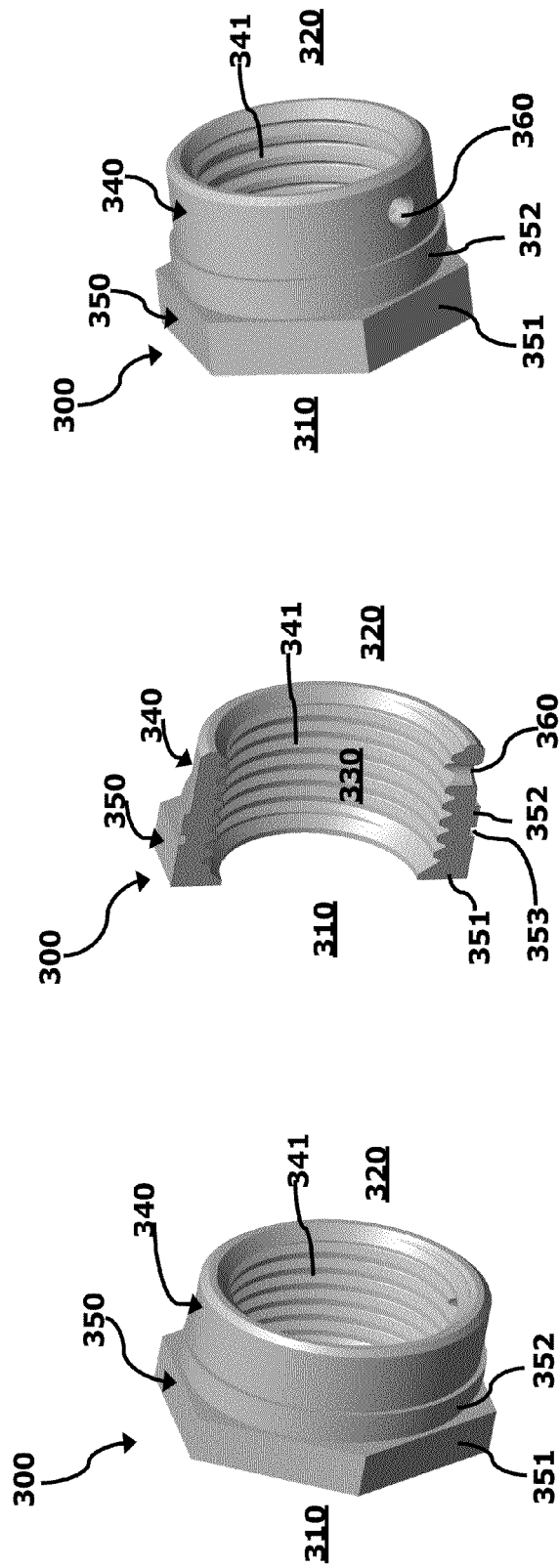

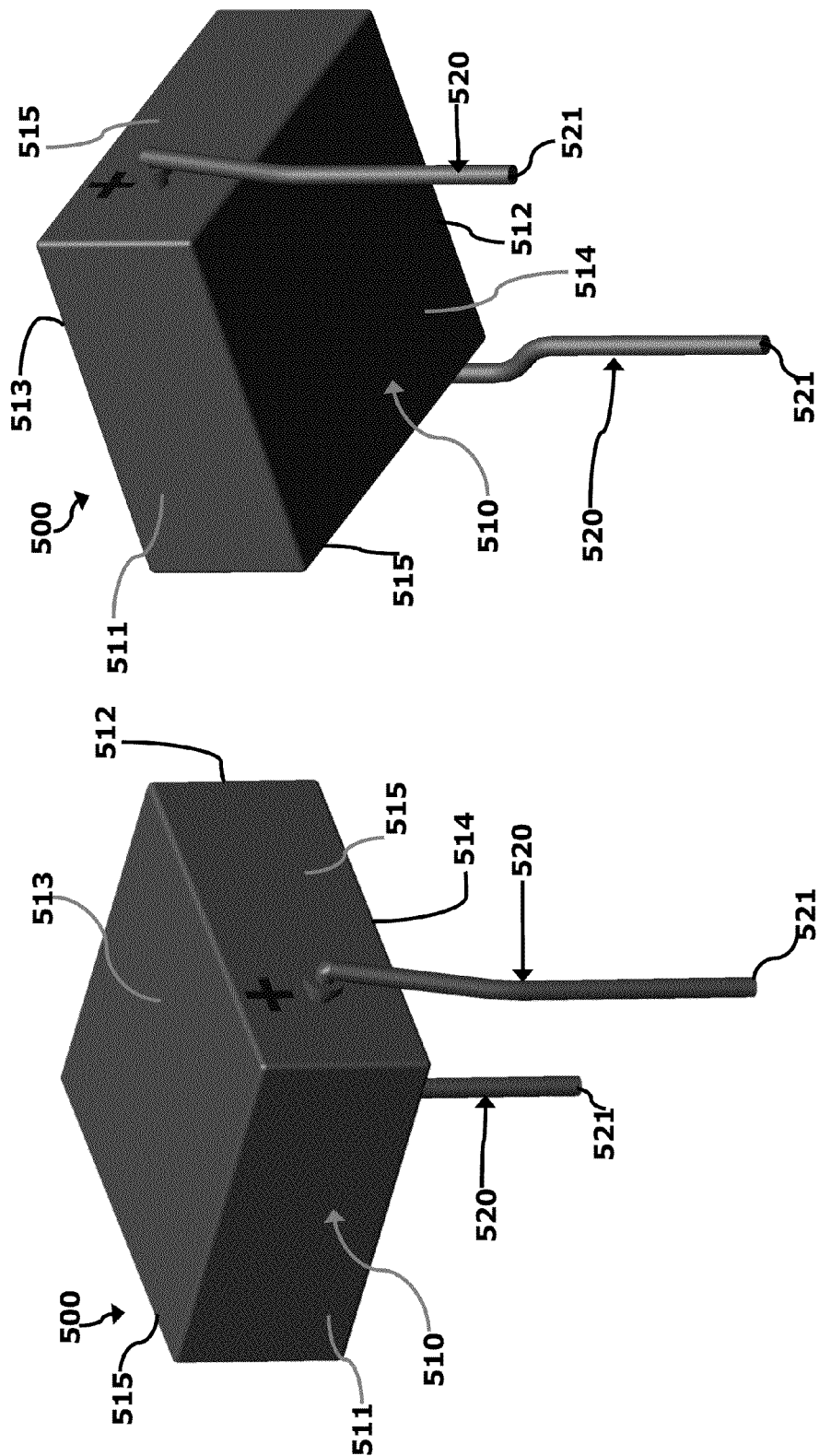

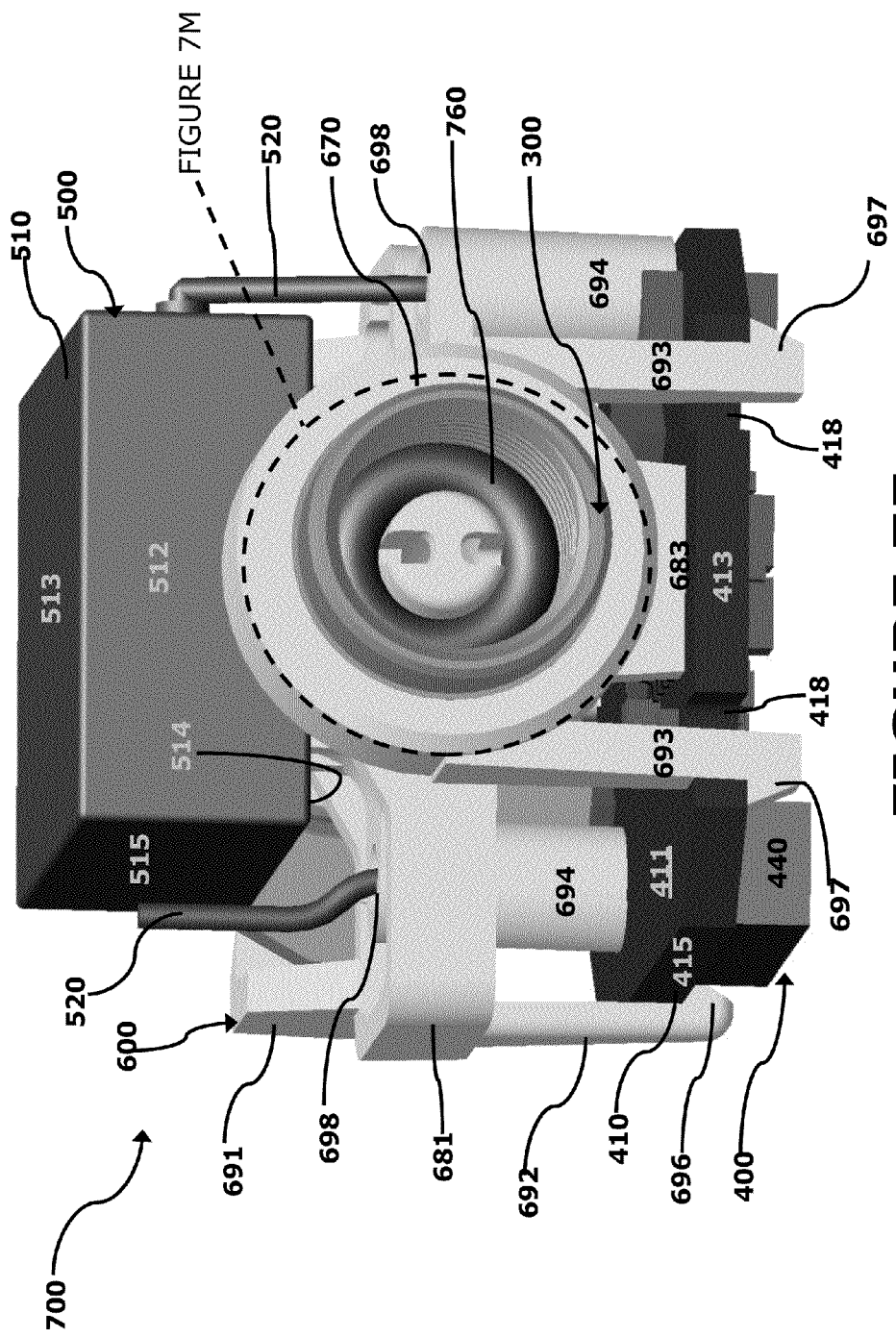

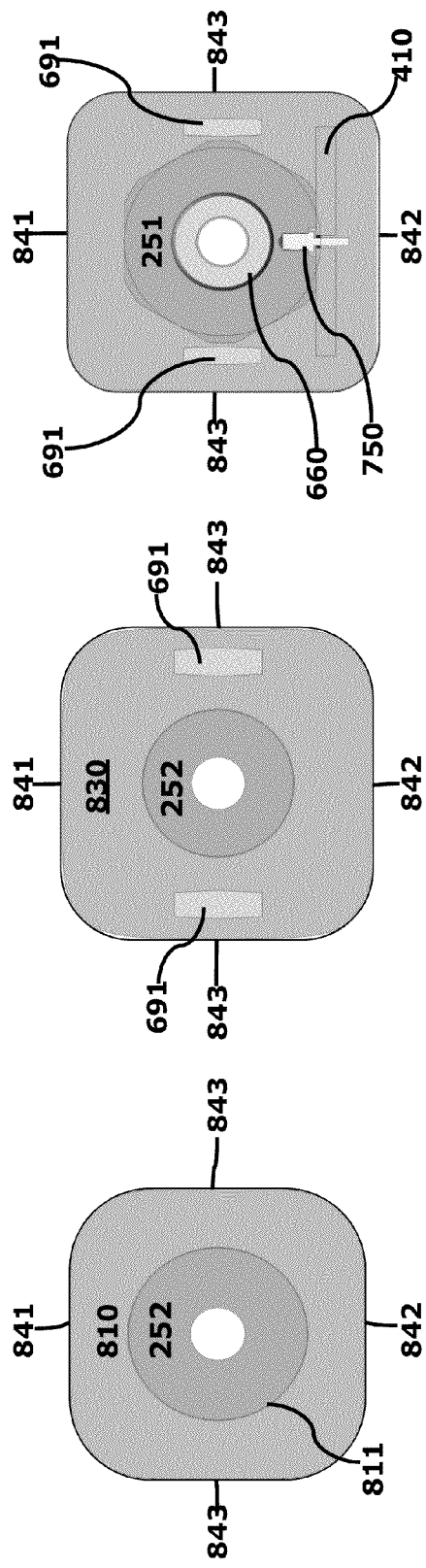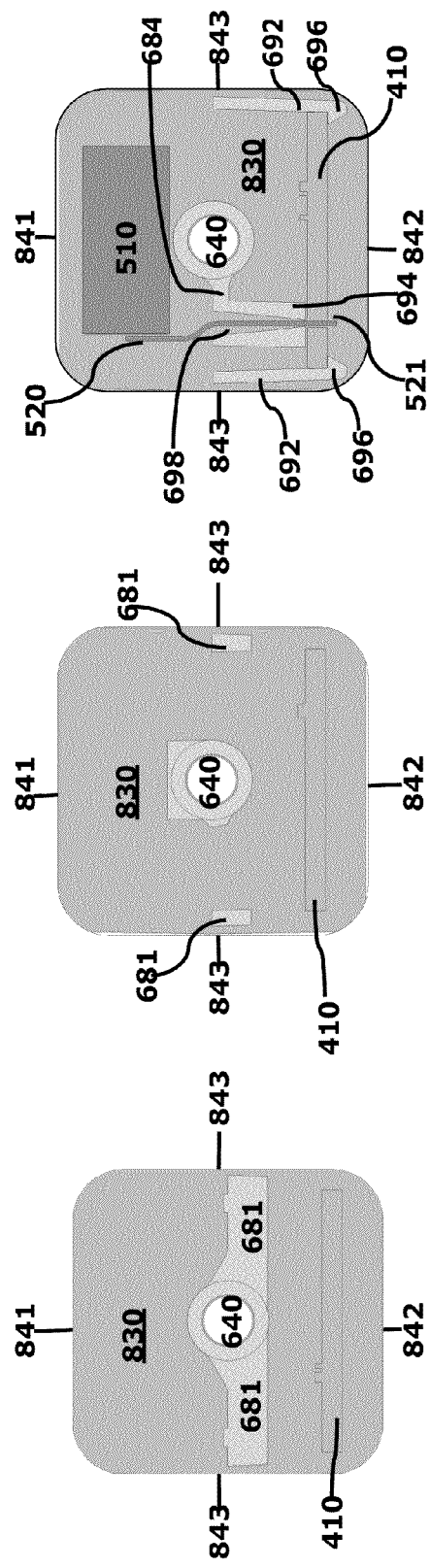

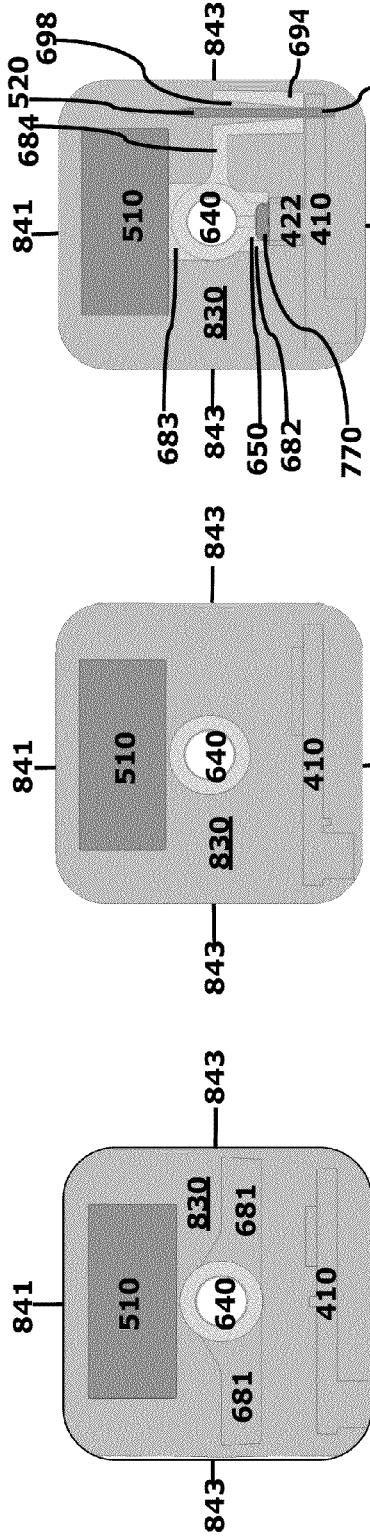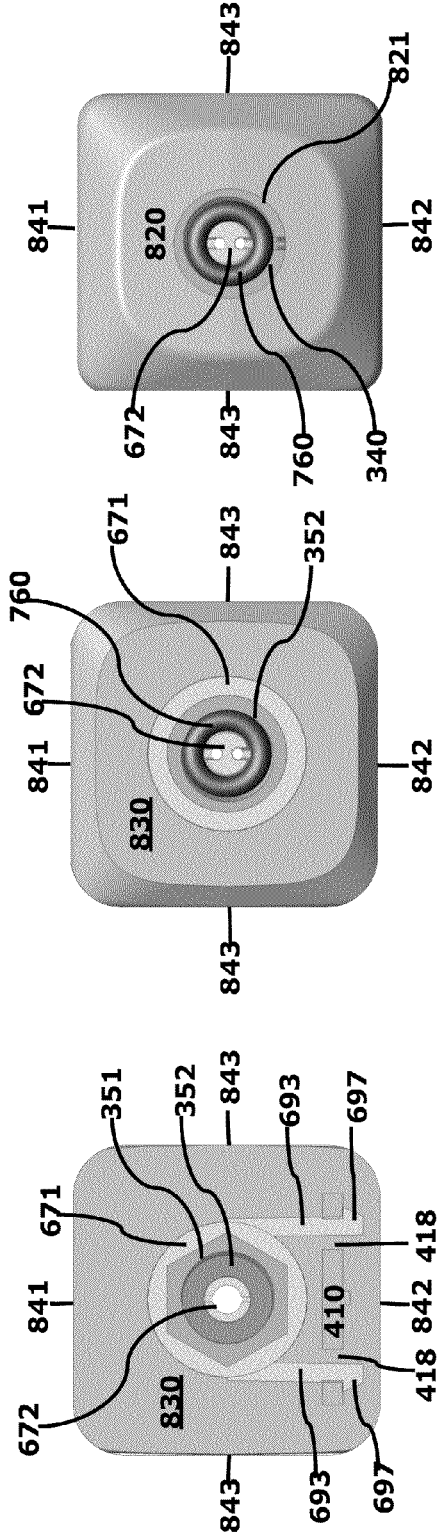

US 8,881,586 B2

TIRE-CONDITION-ASCERTAINING CARTRIDGE

RELATED APPLICATION

This application claims priority under 35 U.S.C. §119(e) to U.S. Provisional Patent Application No. 61/600,713, filed on Feb. 20, 2012, and to U.S. Provisional Patent Appliction No. 61/552,439, filed on Oct. 27, 2011, the entire disclosures of both are hereby incorporated by reference.

BACKGROUND

Roadway vehicles, such as trucks, commonly ride on wheels which each include a pneumatic tire. It has long been known that significant advantages (e.g., higher mileage, lower maintenance costs, improved safety, etc.) can be gained by frequently assessing the condition of such tires. But this has often been easier said than done, as a sturdy yet dependable device for ascertaining tire conditions has proven difficult to build in an economic manner.

SUMMARY

A tire-condition-ascertaining cartridge is provided which is sturdy, dependable, and buildable in an economic manner. The cartridge comprises a "scaffoyer" structure which provides both scaffolding and fluid-foyer-forming functions. The scaffoyer allows a fluid fitting to effectively perform also as an antenna, permits precise posturing of key cartridge components during manufacture, and/or enhances sturdy encapsulation of otherwise impact-vulnerable parts. And if the scaffoyer is made from a suitably strong material, it can further function as a reinforcing skeleton in the completed cartridge.

DRAWINGS

Figure 1A:
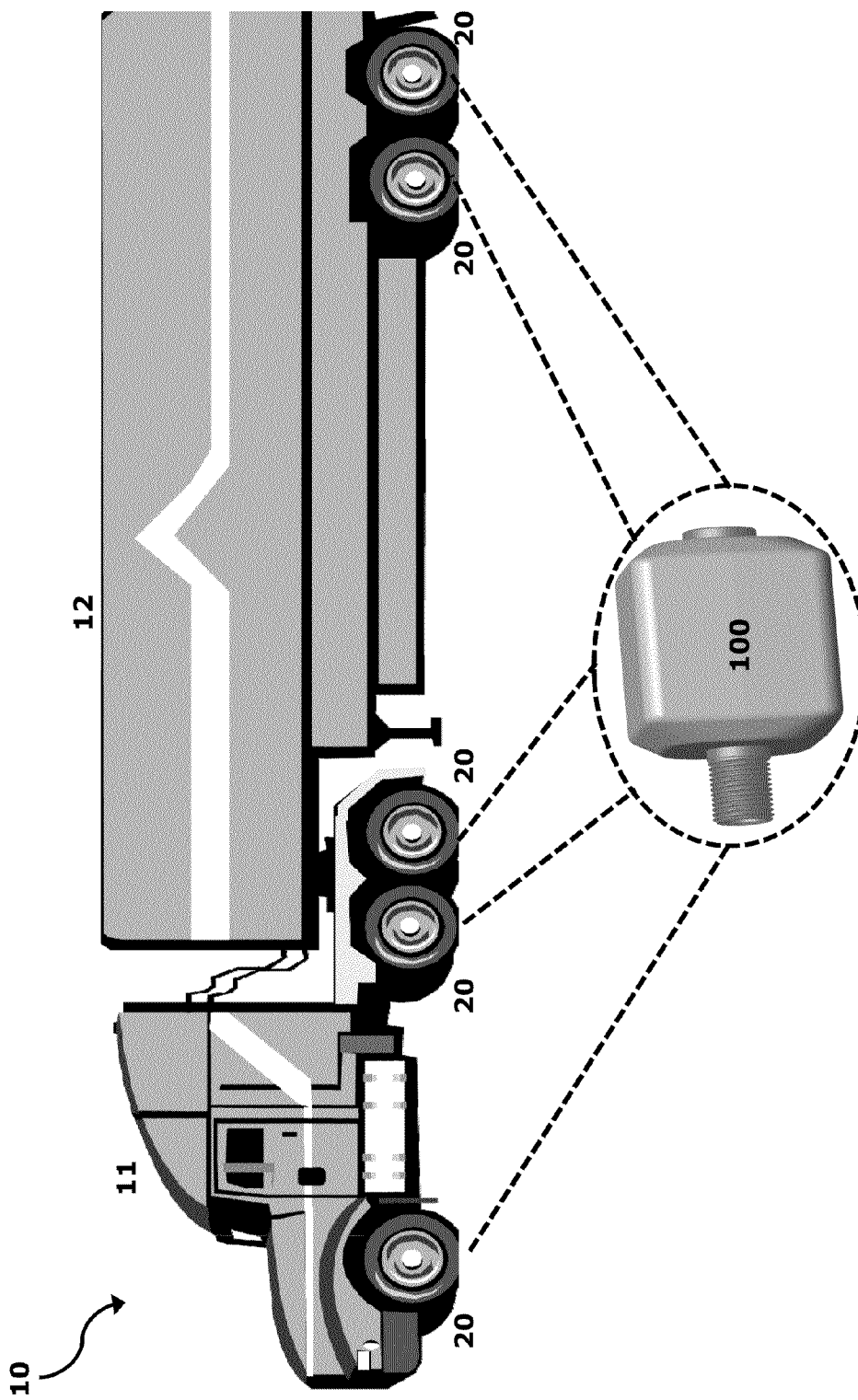
Figure 1B:
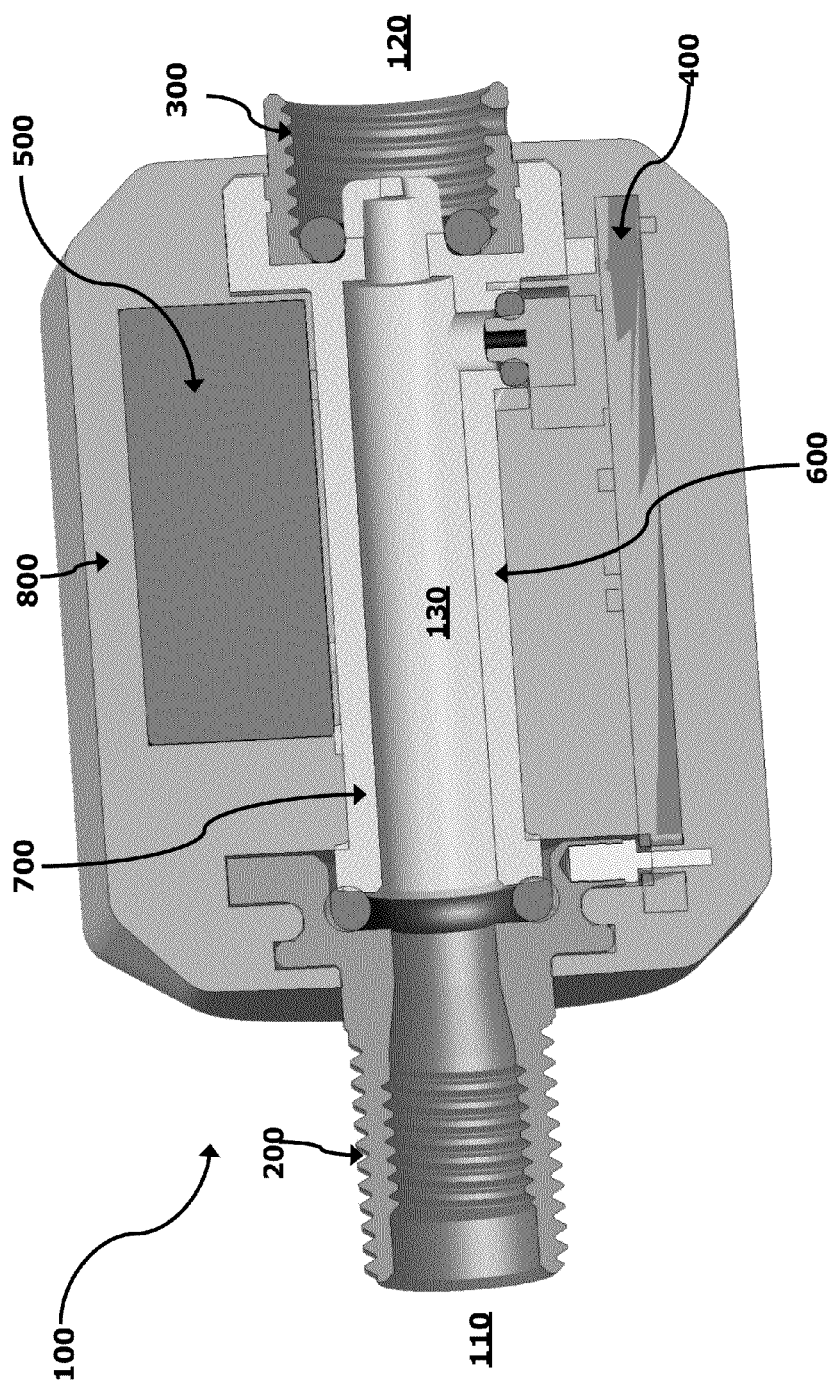
Figure 2B:
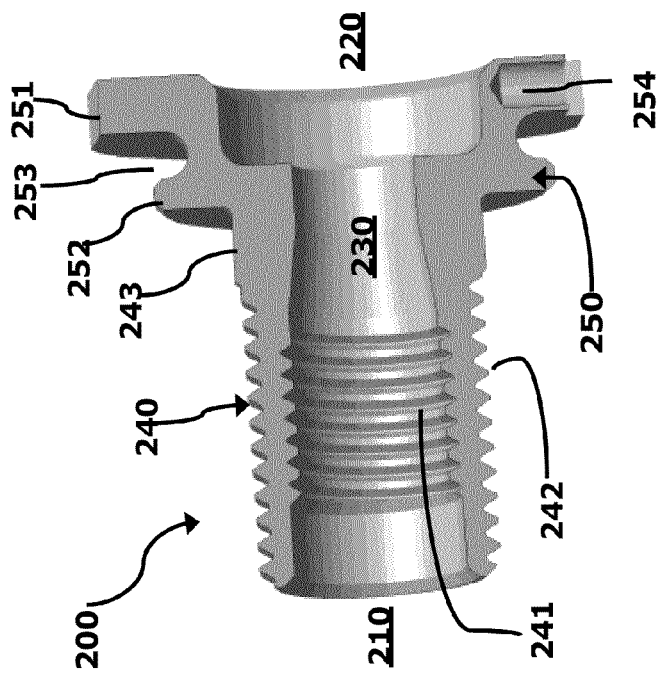
Figure 2A:
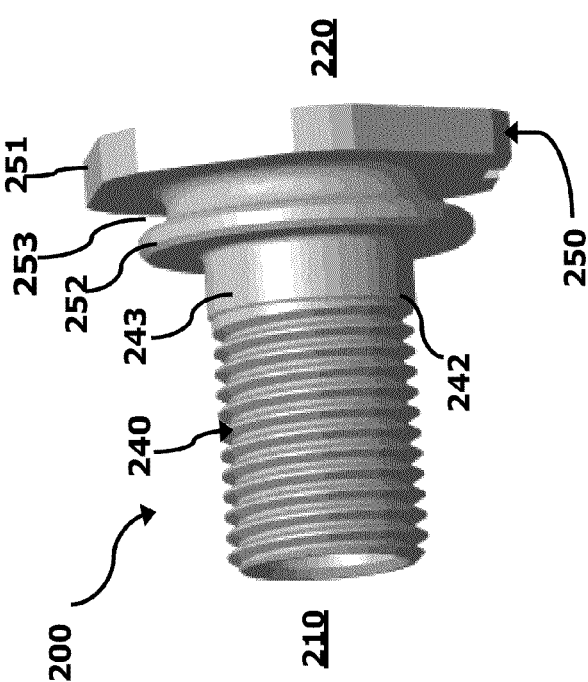
Figures 4A, 4B:
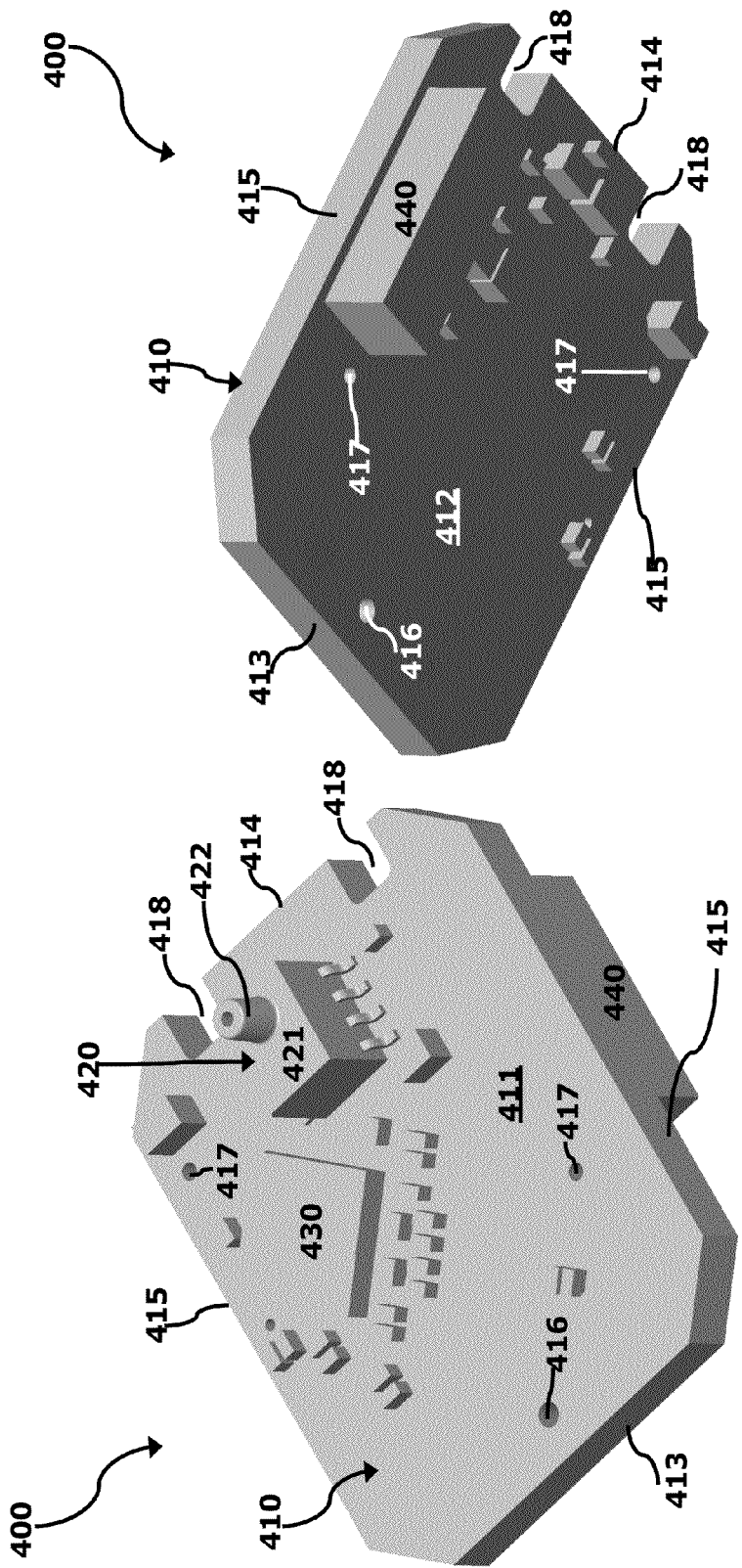
Figure 6A:
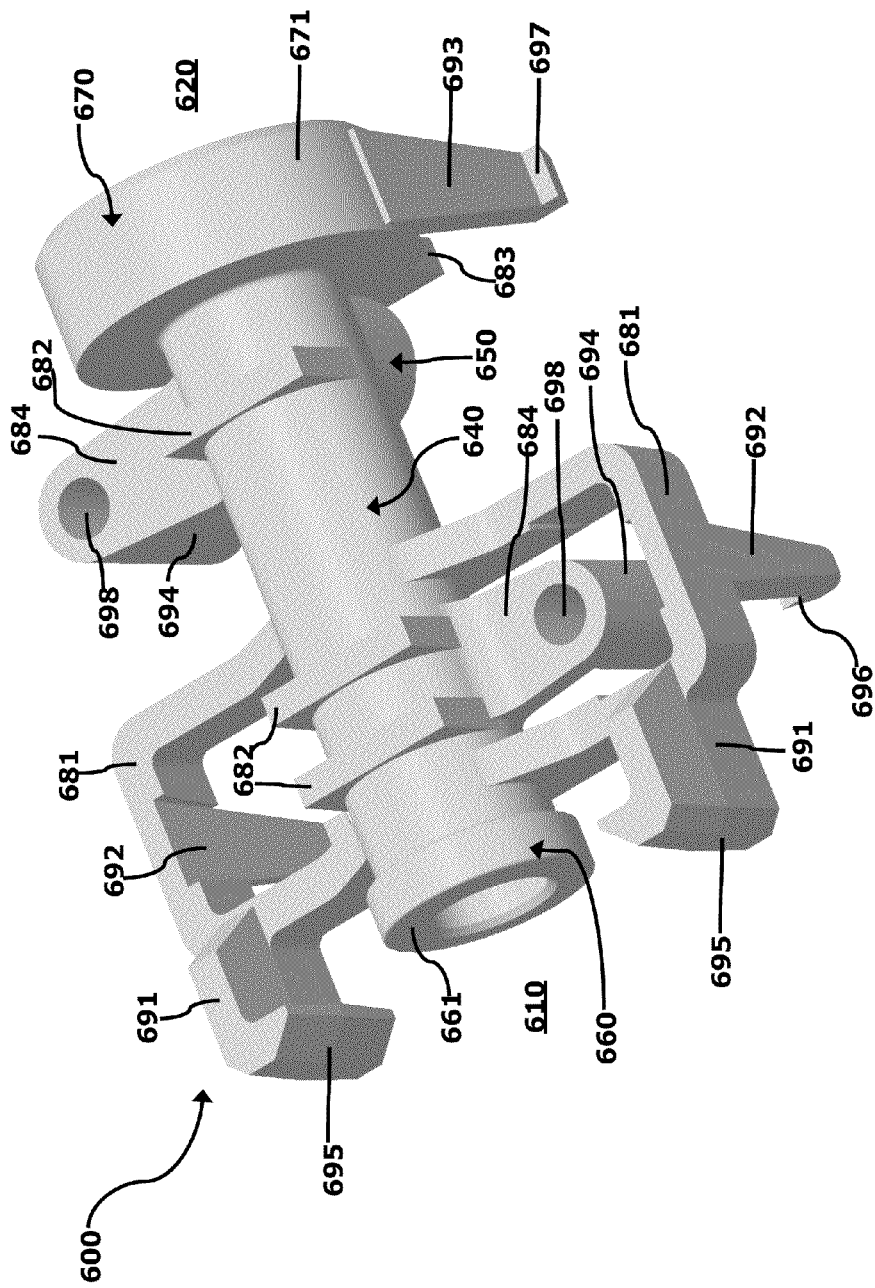
Figure 6B:
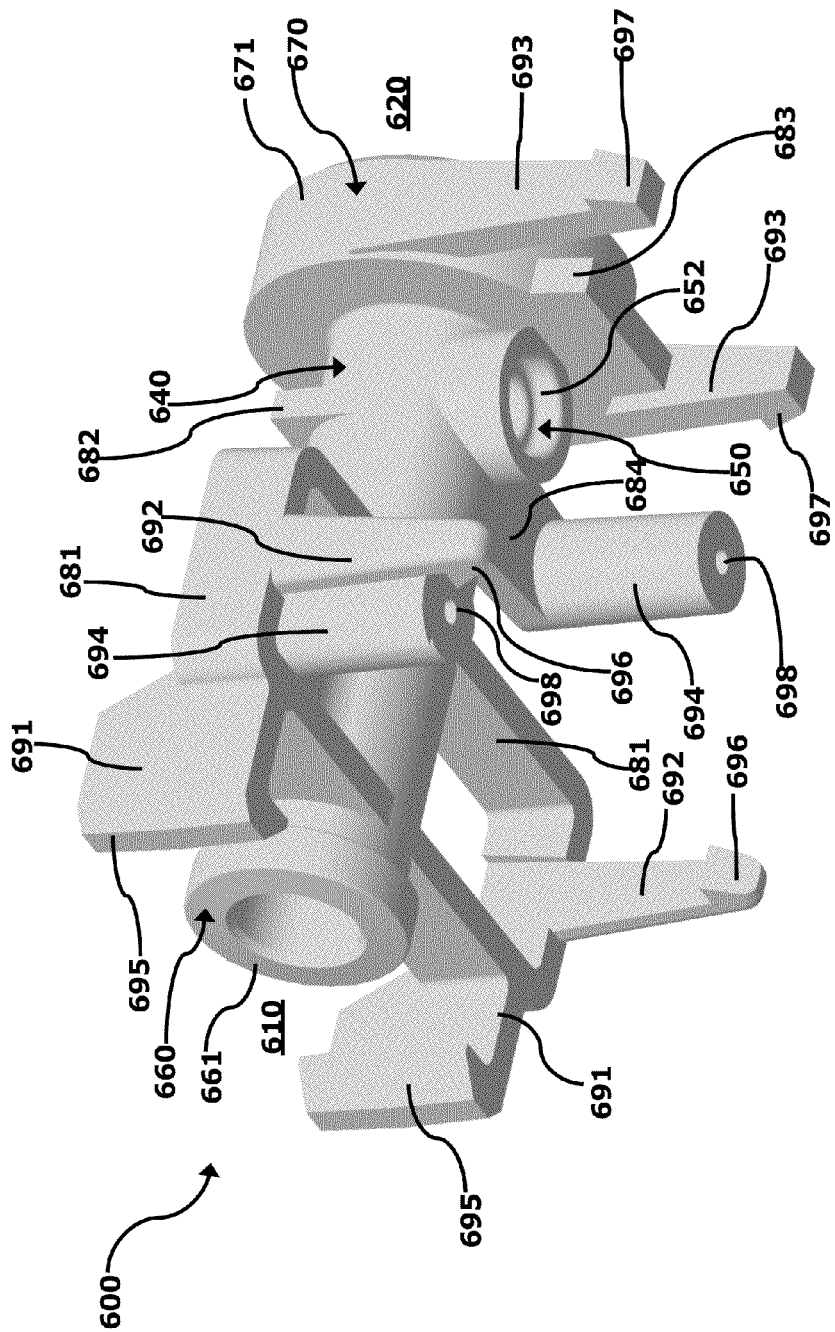
Figure 6C:
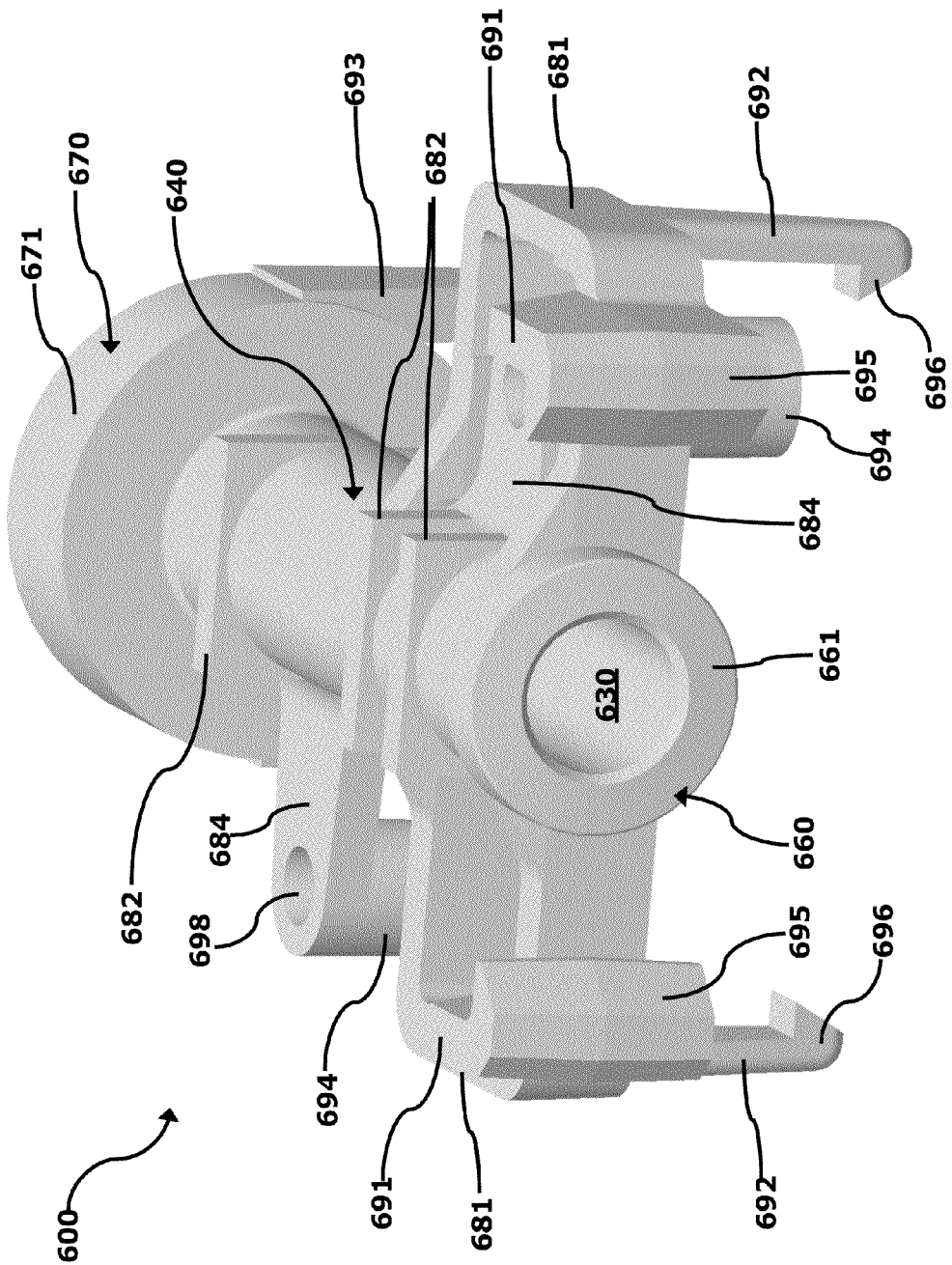
Figure 6D:
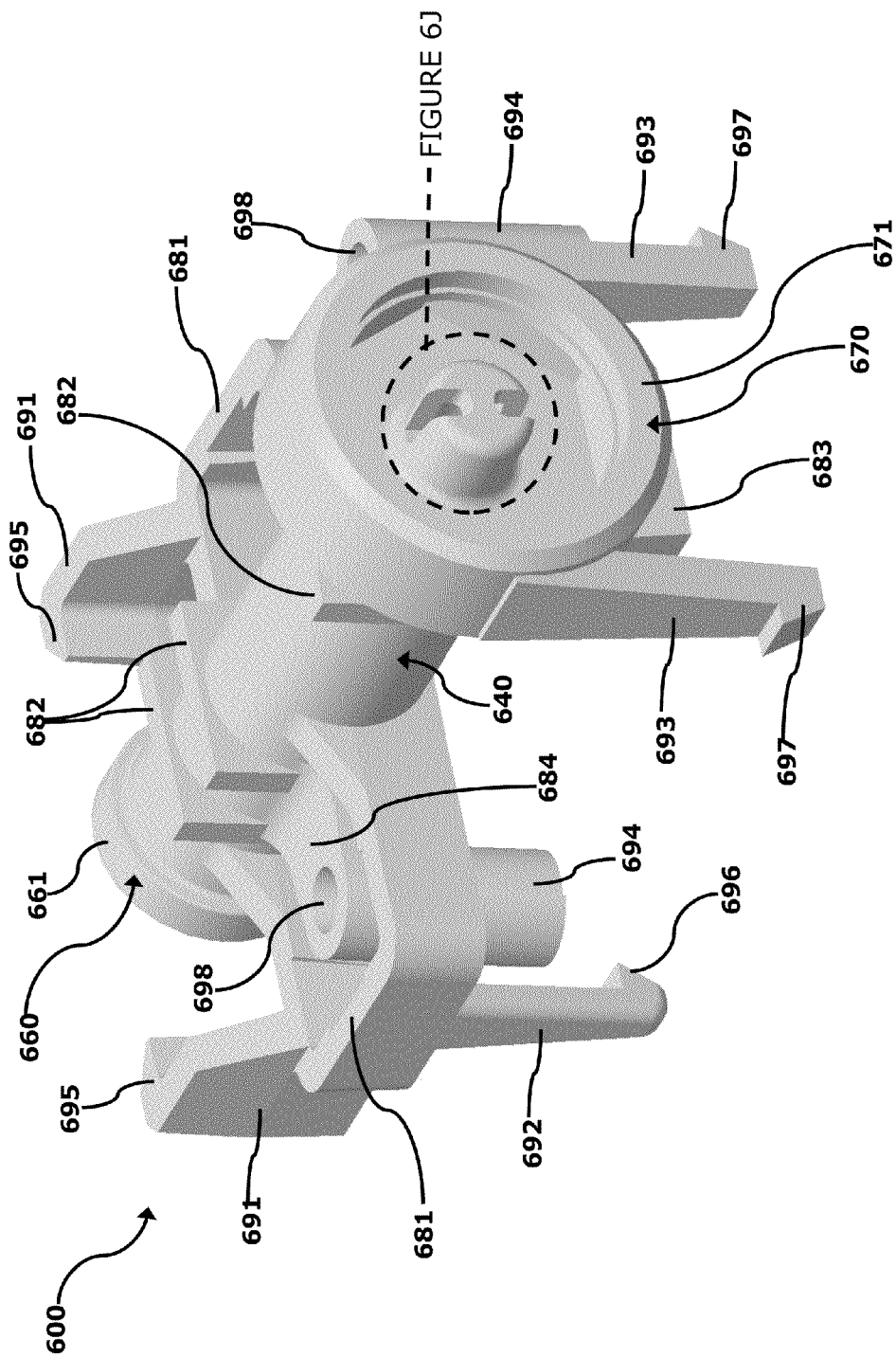
Figure 6E:
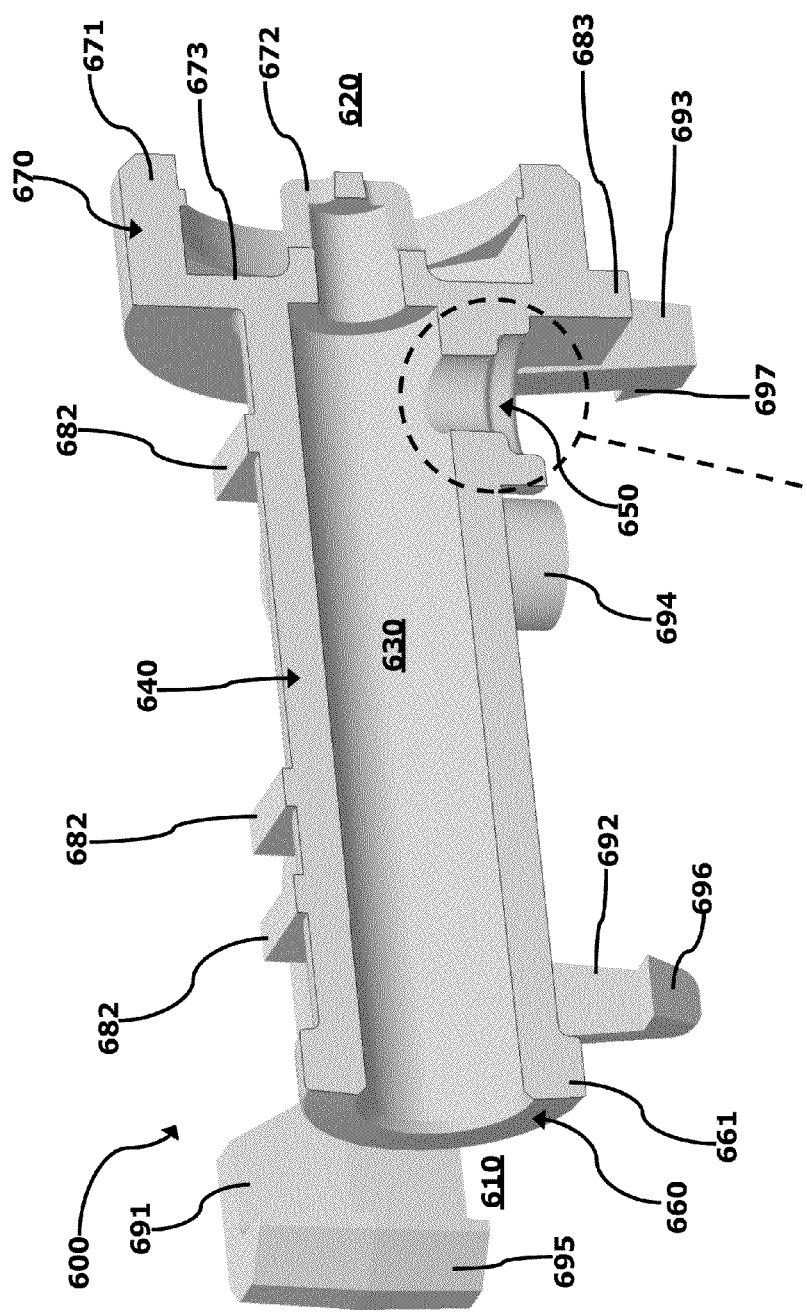
Figure 6F:
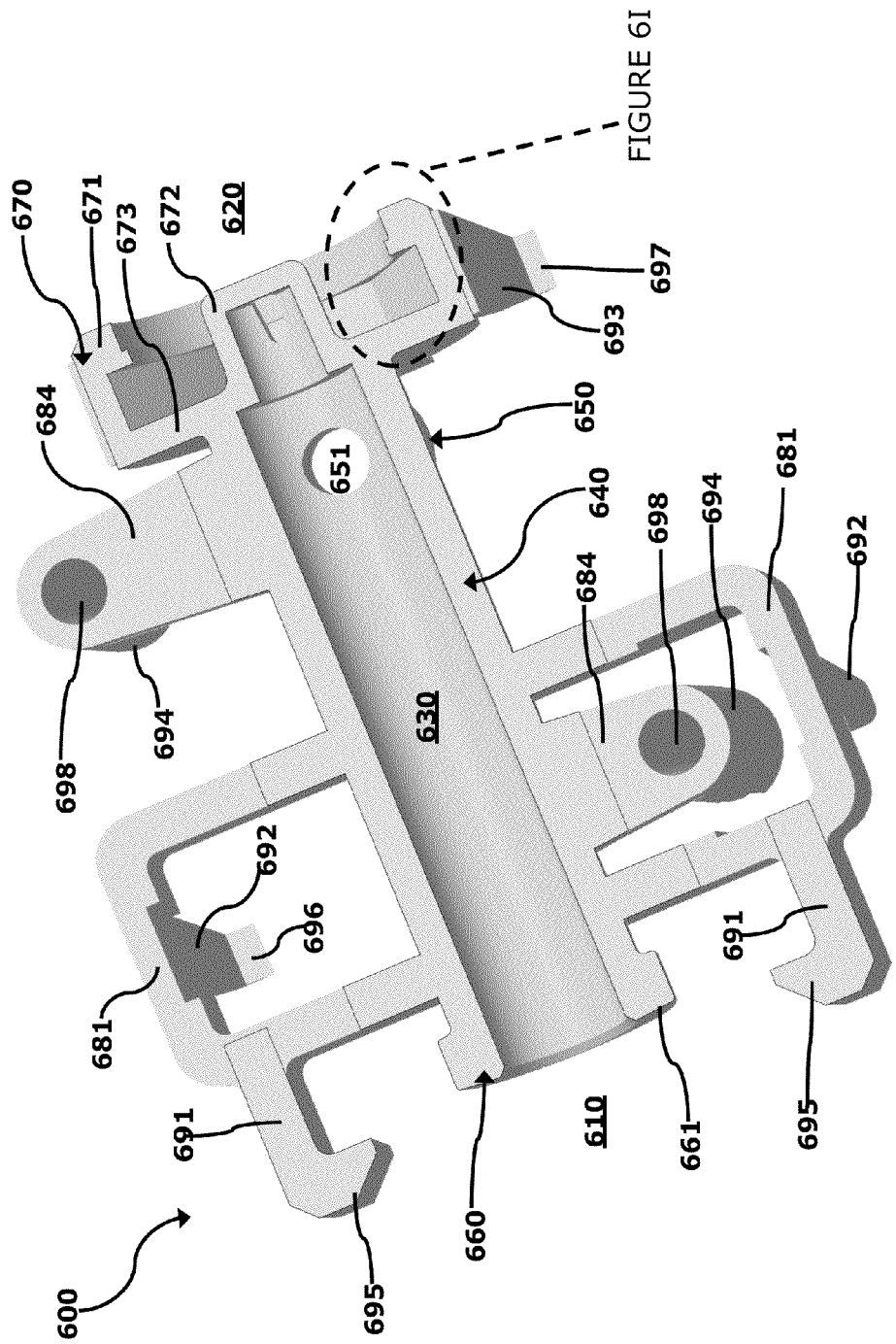
Figure 6G:
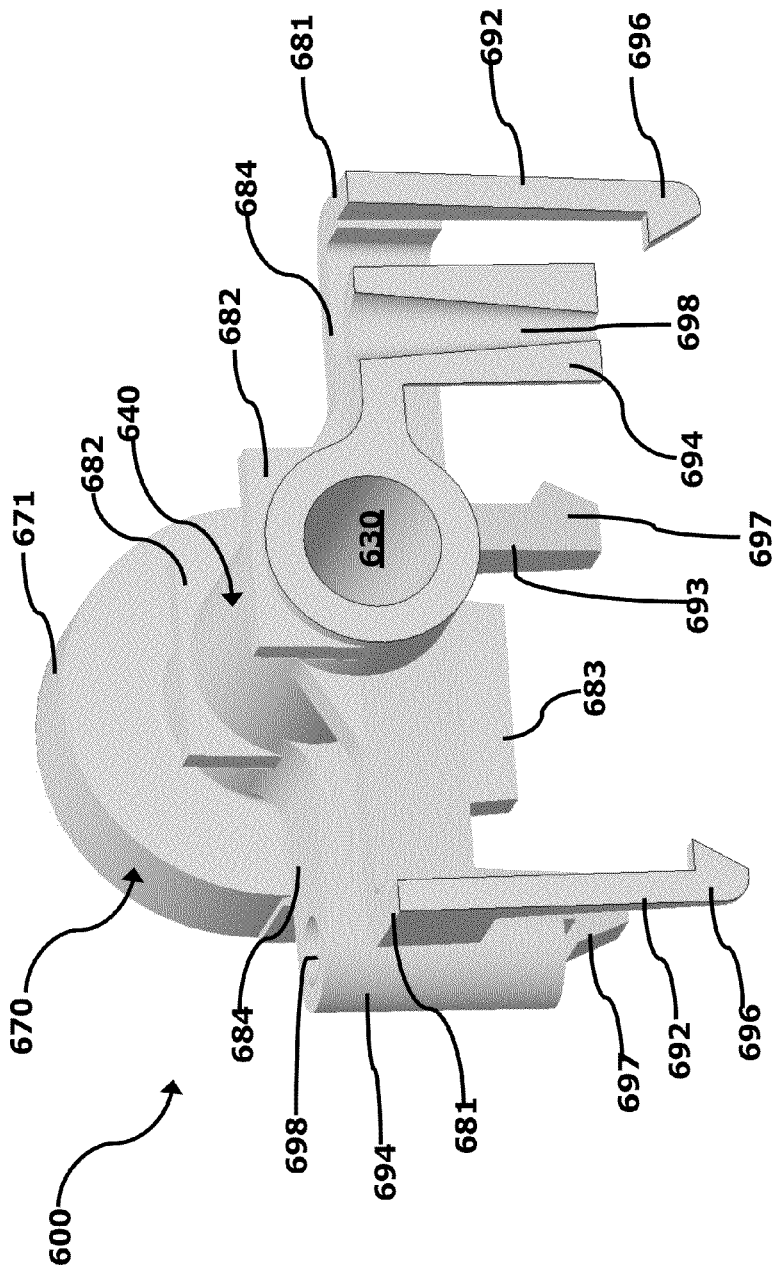
Figure 6J:
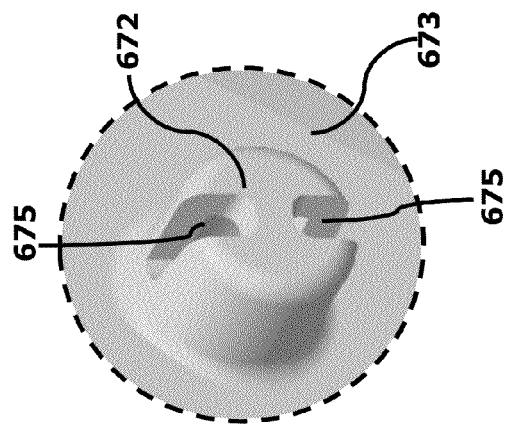
Figure 6I:
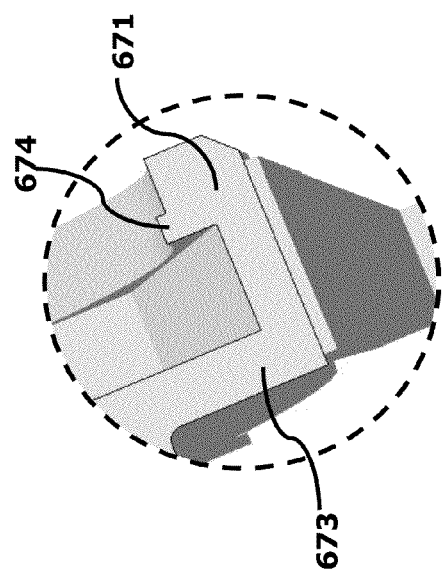
Figure 6H:
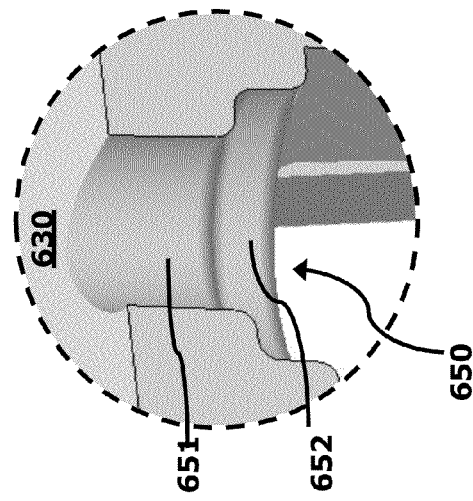

FIG. 1A shows a truck with tire-condition-ascertaining cartridges 100 installed on its wheels and FIG. 1B shows the cartridge 100.

FIGS. 2A-2D, FIGS. 3A-3C, FIGS. 4A-4B, FIGS. 5A-5B, FIGS. 6A-6J, FIGS. 7A-7N, and FIGS. 8A-8P, show various views of a first fitting 200, a second fitting 300, an electronics assembly 400, a power source 500, a scaffoyer 600, a subassembly 700, and a housing capsule 800, respectively.

FIGS. 9A-9G show steps of a cartridge-constructing method 900.

DESCRIPTION

Referring now to the drawings, and initially to FIG. 1A, a truck 10 comprises a tractor 11 and trailer 12 which ride on a set of wheels 20. Each wheel 20 has a tire-condition-ascertaining cartridge 100 associated therewith. The cartridges 100 continuously sense respective tire pressures and then convey this information to an appropriate site. This site can be, for example, the cab of the tractor 11 for consideration by the truck driver and/or an in-vehicle alarm-triggering device. Additionally or alternatively, the tire-pressure-sensing data can be transmitted to a remote site for evaluation by a reviewing party.

Cartridge 100

FIG. 1B

The cartridge 100 comprises a first fitting 200, a second fitting 300, an electronics assembly 400, a power source 500, and a scaffoyer 600. In the preferred cartridge construction, these components are compiled in a subassembly 700. Subassembly or not, the cartridge 100 further comprises a housing capsule 800 which surrounds the electronics assembly 400, the power source 500, and the scaffoyer 600.

The cartridge components form a first end 110, a second end 120, and a fluid passage 130 extending therebetween. The cartridge's longitudinal direction is considered the direction between its first end 110 and its second end 120. The illustrated orientation of the cartridge 100 is used to define its upward/downward directions. And the lateral direction is that perpendicular to longitudinal and up-down planes of reference.

First Fitting 200

FIGS. 2A-2D

The first fitting 200 comprises a distal end 210, a scaffoyer-proximate end 220, and a passageway 230 extending therebetween. In the assembled cartridge 100, the fitting's distal end 210 forms the first end 131 and the passageway 230 forms a first end region of the fluid passage 130. The first fitting 200 can be made of an electrically conductive material (e.g., a metal such as brass) and adapted for electrical connection to the electronics assembly 400 so that it can also function as the cartridge's antenna.

In the illustrated fitting 200, non-proximate regions of the passageway 230 are defined by a cylindrical wall 240 and its proximate region is defined by a brim 250. The cylindrical wall 240 can be provided with internal threads 241, external threads 242, and a brim-abutting neck 243. The brim 250 can comprise an end flange 251, a radially shorter flange 252 adjacent the neck 243, and an alcove 253 bowing therebetween. A lower edge of the flange 251 has a bore 254 extending towards (but not into) the passageway 230.

If the cartridge 100 is to be externally mounted and/or if it is to include a valve (FIG. 1B), the internal threads 241 can mate with the poppet 101 as shown in FIG. 2D. The external threads 242 can mate with an air-hose nozzle when the tire 30 is being inflated. If the cartridge 100 is to be internally mounted, the threads 241/242 may not be necessary.

Second Fitting 300

FIGS. 3A-3C

The second fitting 300 comprises a distal end 310, a scaffoyer-proximate end 320, and a passageway 330 extending therebetween. In the assembled package 100, the fitting's distal end 320 forms the second end 120 and the passageway 330 forms a second end region of the fluid passage 130. The second fitting 300 can be made of a material which is suitable for field threading onto the wheel 20. It can be made of the same material as the first fitting 200 (e.g., a metal such as brass). Electrical conductivity is not a concern with the second fitting 300 unless it somehow contributes to antenna attributes In the illustrated second fitting 300, non-proximate regions of the passageway 330 are defined by a cylindrical wall 340 and its proximate region is defined by a brim 350. The cylindrical wall 340 can have internal threads 341 for mating with the stem inlet 51 if the cartridge 100 is exteriorly mounted (FIG. 1B) or for mating with the plug 106 if the cartridge 100 is interiorly mounted (FIG. 1C). The brim 350 can comprise a hexagon end flange 351, a circular neck 352, and a notch 353 therebetween.

A posing feature 360 (e.g. a hole) can be provided on the fitting 300 to accurately position the fitting 300, and/or components attached thereto during manufacturing steps. In the illustrated fitting 300, this feature 360 is situated on the bottom of the cylindrical wall 340.

Electronics Assembly 400

FIGS. 4A-4B

The electronics assembly 400 can comprise a substrate 410, such as the illustrated printed circuit board, which supports some or all of the cartridge electronics. These electronics can include, for example, a condition sensor 420, a processor 430, and a transceiver 440.

The illustrated substrate 410 comprises a top surface 411, a bottom surface 412, a first edge 413, a second edge 414, and lateral edges 415. The substrate 410 can be patterned with holes, slots, or other apertures for the lodging of electronic-related items in the cartridge 100. For example, one hole 416 is situated near the first edge 413, two holes 417 are arranged catty-corner relative to the lateral edges 415, and two slots 418 extend inward from the second edge 414.

The tire-condition sensor 420 can comprise a capacitive-type transducer 421 with a stack 422 providing an inlet port for the to-be-sensed fluid. In the illustrated embodiment, transducer 421 is mounted on the top surface 411 of the substrate 410. The stack 422 has a tapered profile and points upward from the transducer 421.

The processor 430 can also be mounted on the substrate's top surface 411 and the transceiver 440 can be mounted on its bottom surface 412. Circuitry throughout the substrate 410 (schematically shown but not specifically numbered) electrically connect the pressure sensor 420, the processor 430, and the transceiver 440 with each other and the power source 500.

Power Source 500

FIGS. 5A-5B

The power source 500 can comprise a battery cell 510 and terminal strips 520 extending therefrom for electrical connection to the electronics substrate 410. The battery cell 510 can be, for example, a 3.6V Lithiumthionly Chloride (Li—SOCl$_2$) embodiment available from Eve Electrical Company.

Its container can be aluminum, with a first wall 511, a second wall 512, a top wall 513, a bottom wall 514, and lateral walls 515. The length and width of the battery cell 510 can be somewhat greater than its height. It may be noted that this cell geometry is compatible with the overall cartridge envelope.

The terminal strips 520 can extend downward from each of the lateral walls 515 of the battery cell 510. They can consist of wire-like structures bendable to pursue preordained paths and their lower ends can be called tails 521. In the illustrated battery, the strips 520 are catty-corner to each other (rather than longitudinally aligned) relative to each other. Specifically, for example, the positive terminal strip 520 can be located near the corner to the first wall 511 and the negative terminal strip 520 can be located near the corner to the second wall 512.

Other battery types, shapes, and even non-battery power sources could instead be incorporated into the cartridge 100. The power source 500 should, however, have a long term operating life (e.g., at least three years) and have good voltage response in a range of expected temperatures (e.g., −10° C. to 100° C.).

Scaffoyer 600

FIGS. 6A-6J

The illustrated scaffoyer 600 comprises a first-fitting end 610, a second-fitting 620, and a fluid foyer 630 extending therebetween. In the completed cartridge 100, the foyer 630 forms the intermediate (and longest) region of the fluid passage 130.

The scaffoyer 600 is preferably formed in one-piece by molding, and more particularly injection molding of a thermoplastic polymer which results in a relatively rigid structure. Additionally or alternatively, it is preferably made of an electrically nonconductive material to enhance the antenna attributes of the first fitting 200 and/or eliminate insulation concerns with the electrical components 400/500. Suitable thermoplastic polymers include, for example, acrylonitrile-butadiene-styrene, acetal, surlyn, and/or nylon.

The illustrated scaffoyer 600 comprises a cylindrical wall 640 and a channel 650. The cylindrical wall 640 forms the fluid foyer 630 and the channel 650 extends radially (e.g., downward) therefrom. The channel 650 includes an access 651 communicating with the fluid foyer 630 and a widened hall 652 thereinto (see particularly FIGS. 6E and 6H).

The cylindrical wall 640 can include a first-fitting collar and second-fitting collar 670 situated first and second ends thereof. The first-fitting collar 660 can comprise a skirt 661 sized to seat inside the brim 250 of the first fitting 200.

The second-fitting collar 670 can comprise a skirt 671, a dais 672, and a deck 673 spanning therebetween. The skirt 671 can include a circular lip 674 projecting radially inward therefrom (see particularly FIGS. 6F and 6I). The dais 672 and the deck 673 close off this end of the cylindrical wall 640, except for openings 675 which communicate with the fluid foyer 630 (see particularly FIGS. 6D and 6J). In preferred scaffoyer-making steps, the collar 670 is molded around second fitting 300 whereby its follows this fitting's contour.

The illustrated scaffolding of the scaffoyer 600 comprises planks 681-686 which extend outward from the cylindrical wall 640 in different radial directions. Open-floor planks 681, for example, spread substantially symmetrically from the wall's opposite lateral sides near the first-fitting collar 650. Planks 682 stand upward on the cylindrical wall 640 at longitudinally aligned sites and a plank 683 dives downward near the second-fitting collar 660. Planks 686 project outward from laterally opposed and longitudinally offset locations on the cylindrical wall 640.

The scaffolding can also comprise derricks 691-696 attached to the scaffolding and/or foyer 630. In the illustrated scaffoyer 600, arm-like derricks 691 are attached to the open-floor planks 681 and reach distally therebeyond. Leg-like derricks 692 suspend from the planks 681 and leg-like derricks 693 suspend from the second-fitting collar 660. The derricks 691-693 can have hooked hands/feet 695-697, with the hands 695 hooking inboard, the feet 696 hooking inboard, and the feet 697 hooking outboard.

The derricks 696 are pedestal-like and hang downward from the planks 686. The pedestal-like derricks 696 each have a hollow conduit 698 extending completely between its top and bottom ends. The top entry 699 into the conduit 698 can be somewhat wide and taper downward (see particularly, FIG. 6G).

Scaffoyer Subassembly 700

FIGS. 7A-7N

The scaffoyer subassembly 700 has a first-fitting end 710, a second-fitting end 720, and a passageway 730 defining the fluid passageway 130 in the completed cartridge 100. The subassembly 700 comprises the scaffoyer 600 and the other non-capsule components of the cartridge 100 secured thereto. In the illustrated embodiment, these non-capsule components include the first fitting 200, the second fitting 300, the electronics assembly 400, and the power source 500.

Figure 7A:
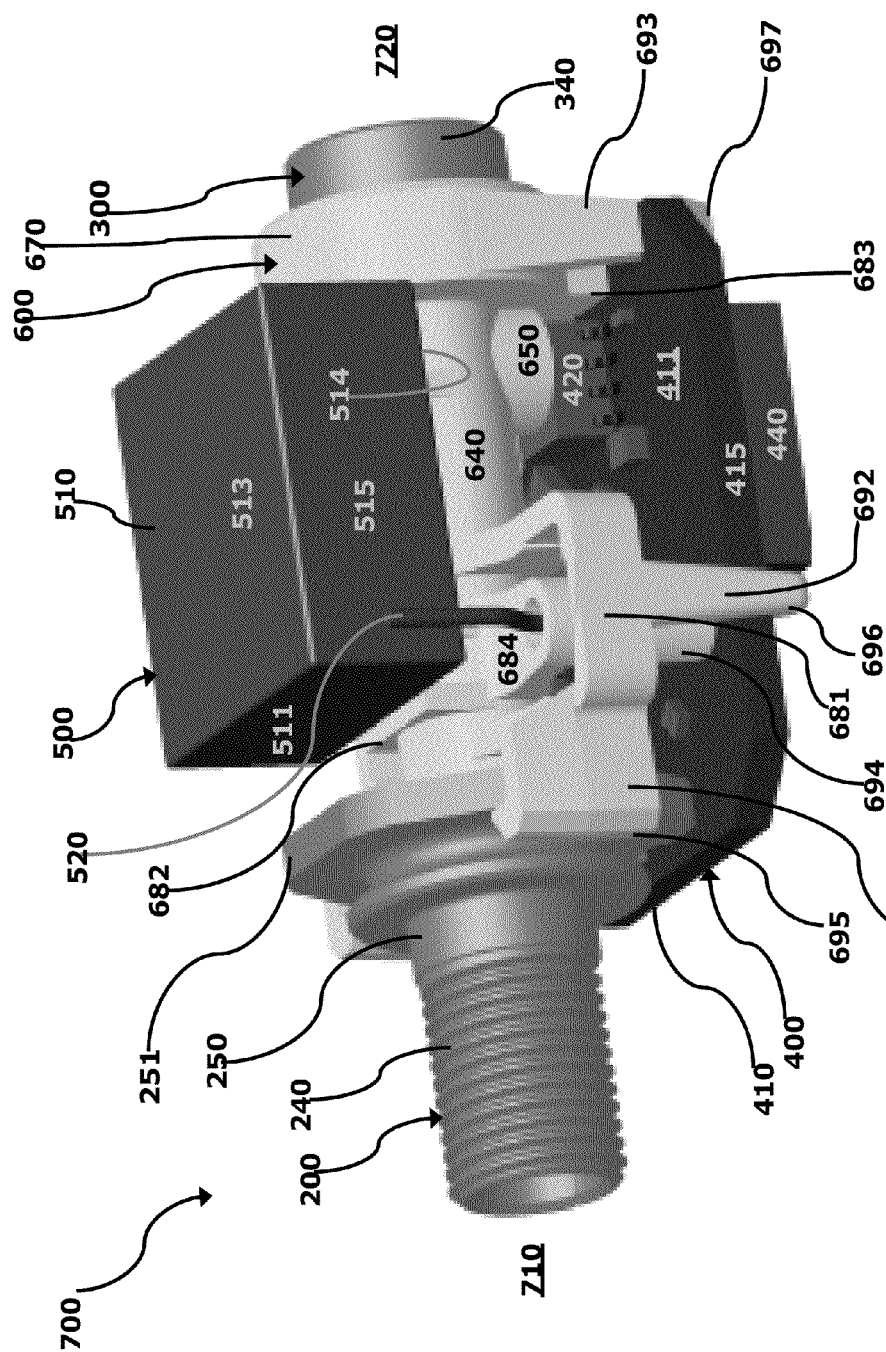
Figure 7B:
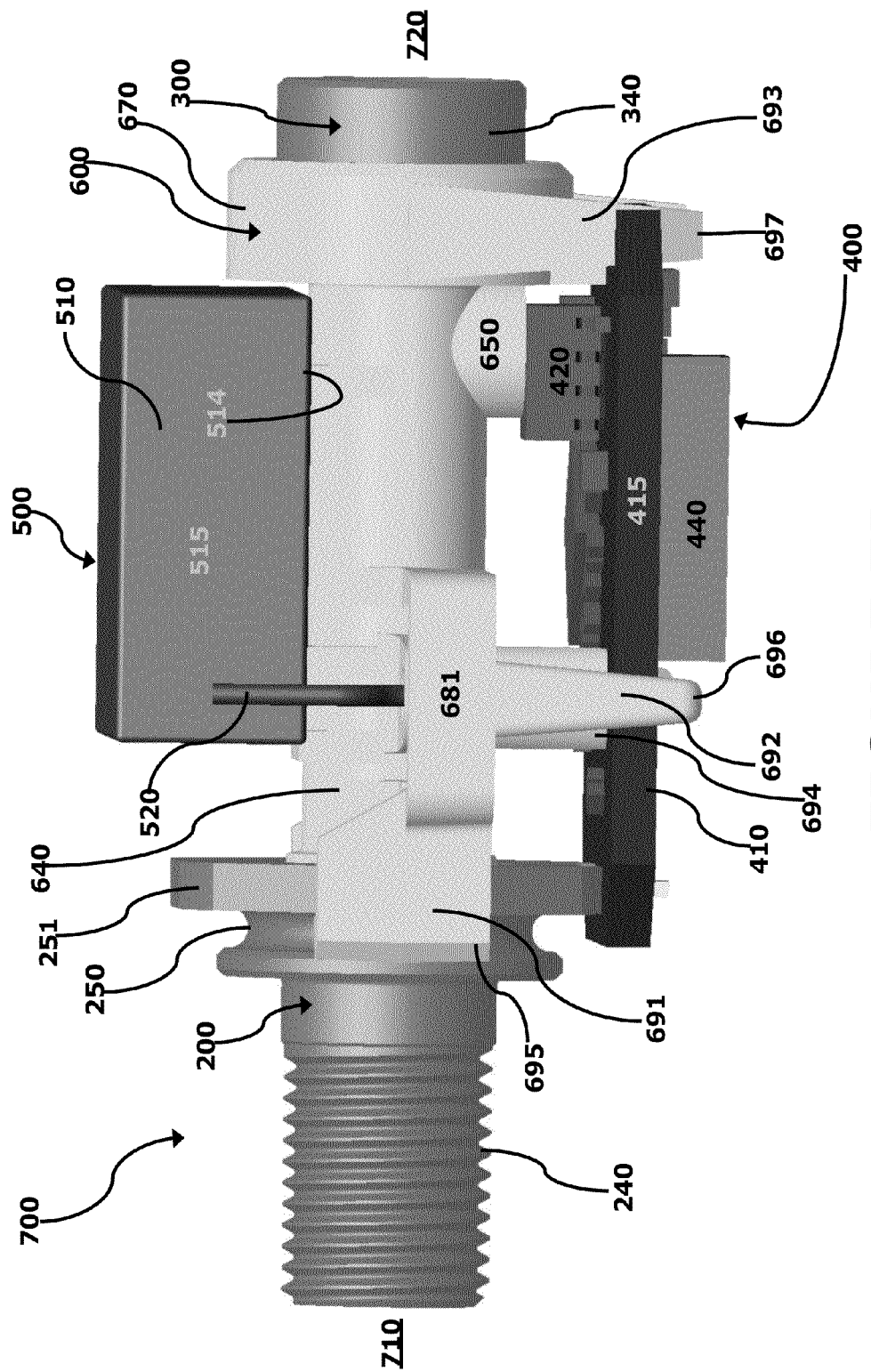
Figure 7C:
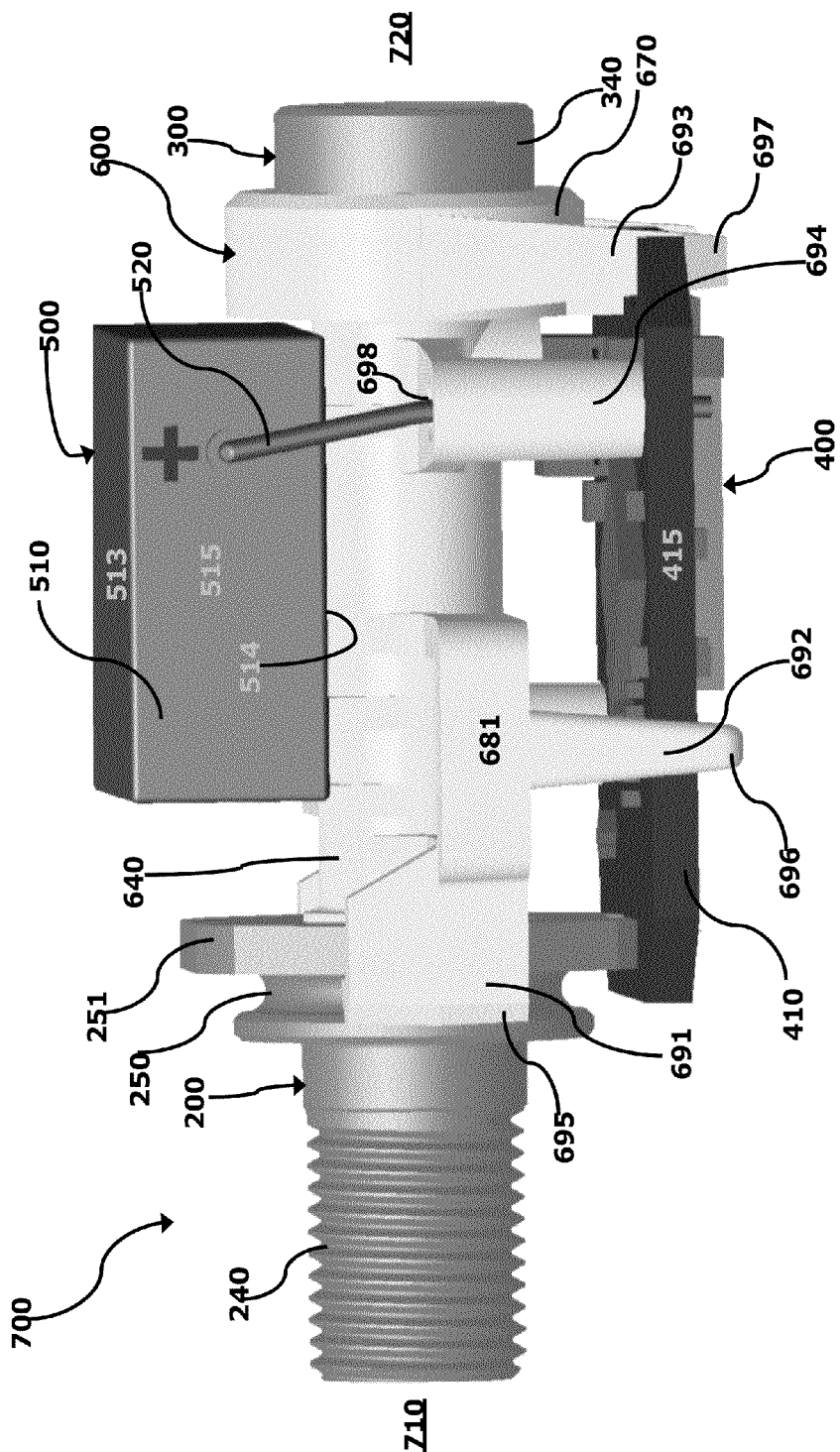
Figure 7D:
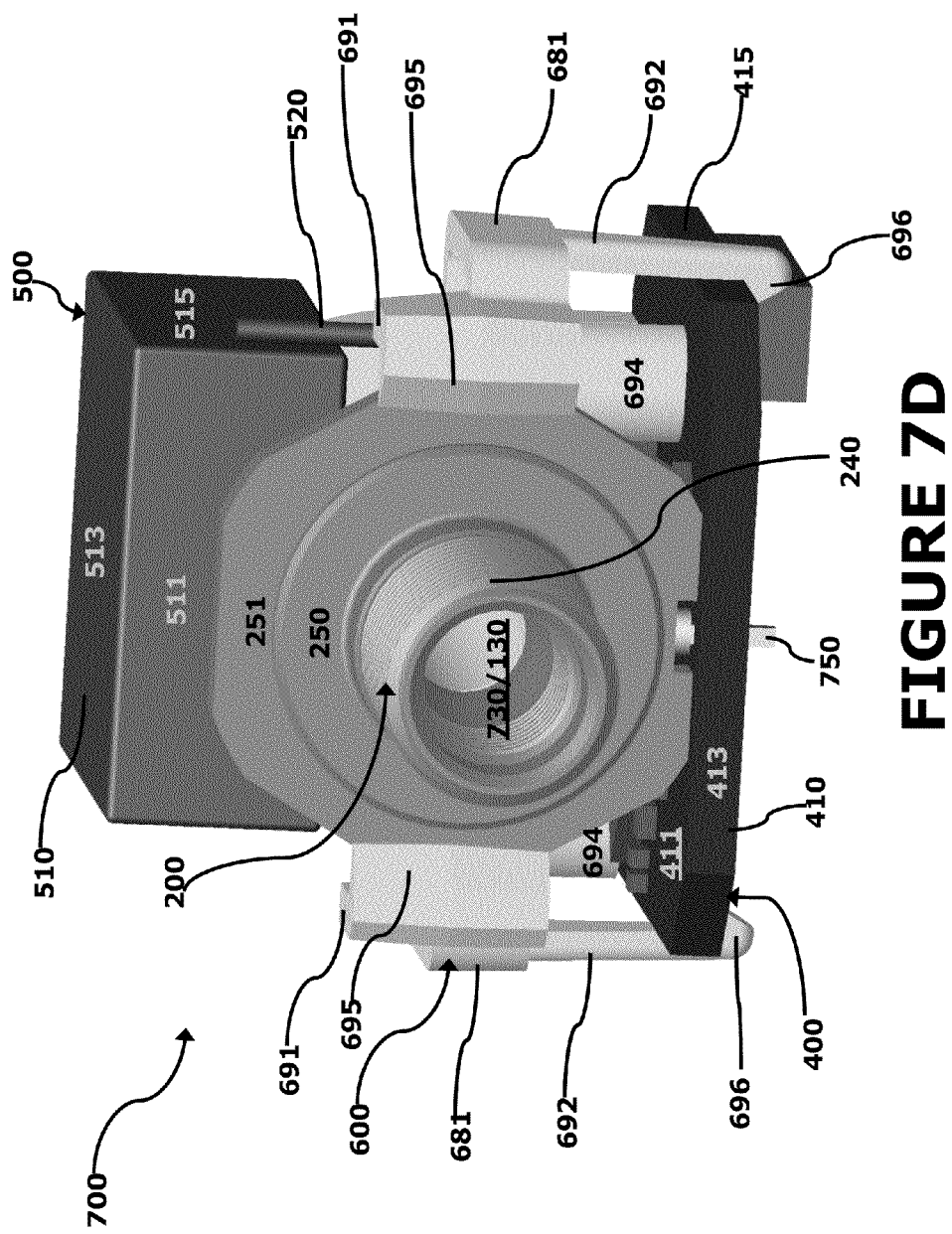
Figure 7F:
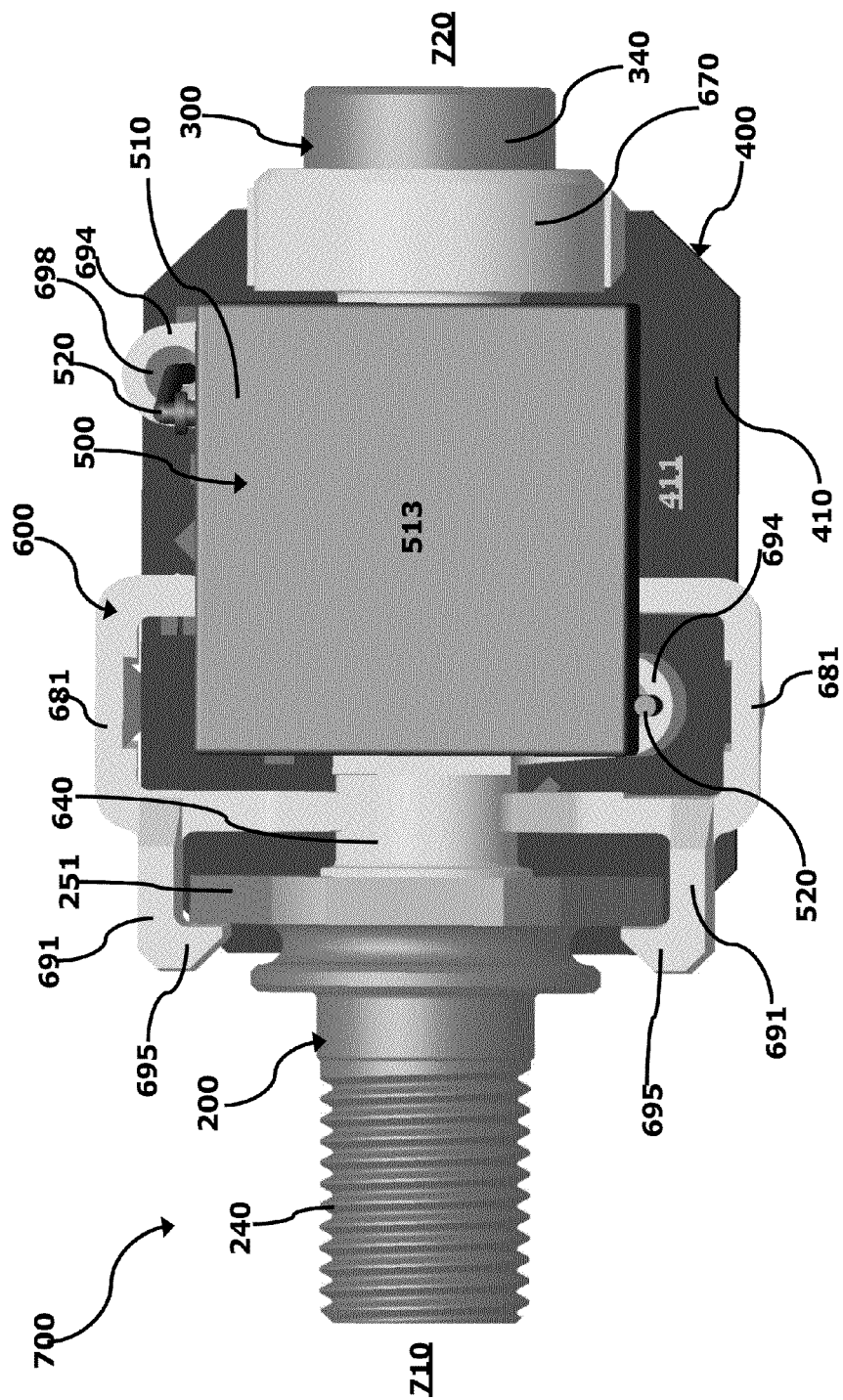
Figure 7G:
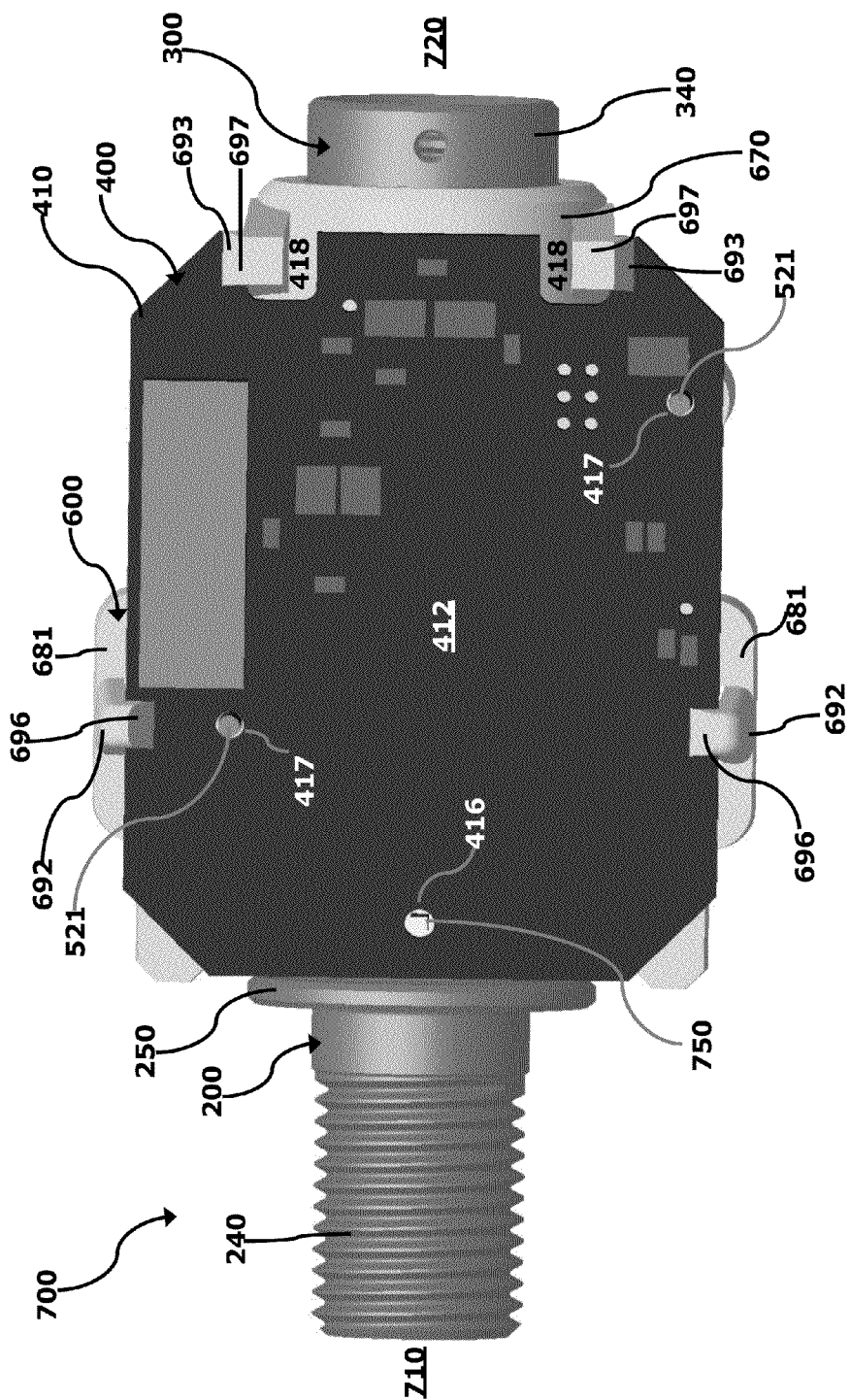
Figure 7H:
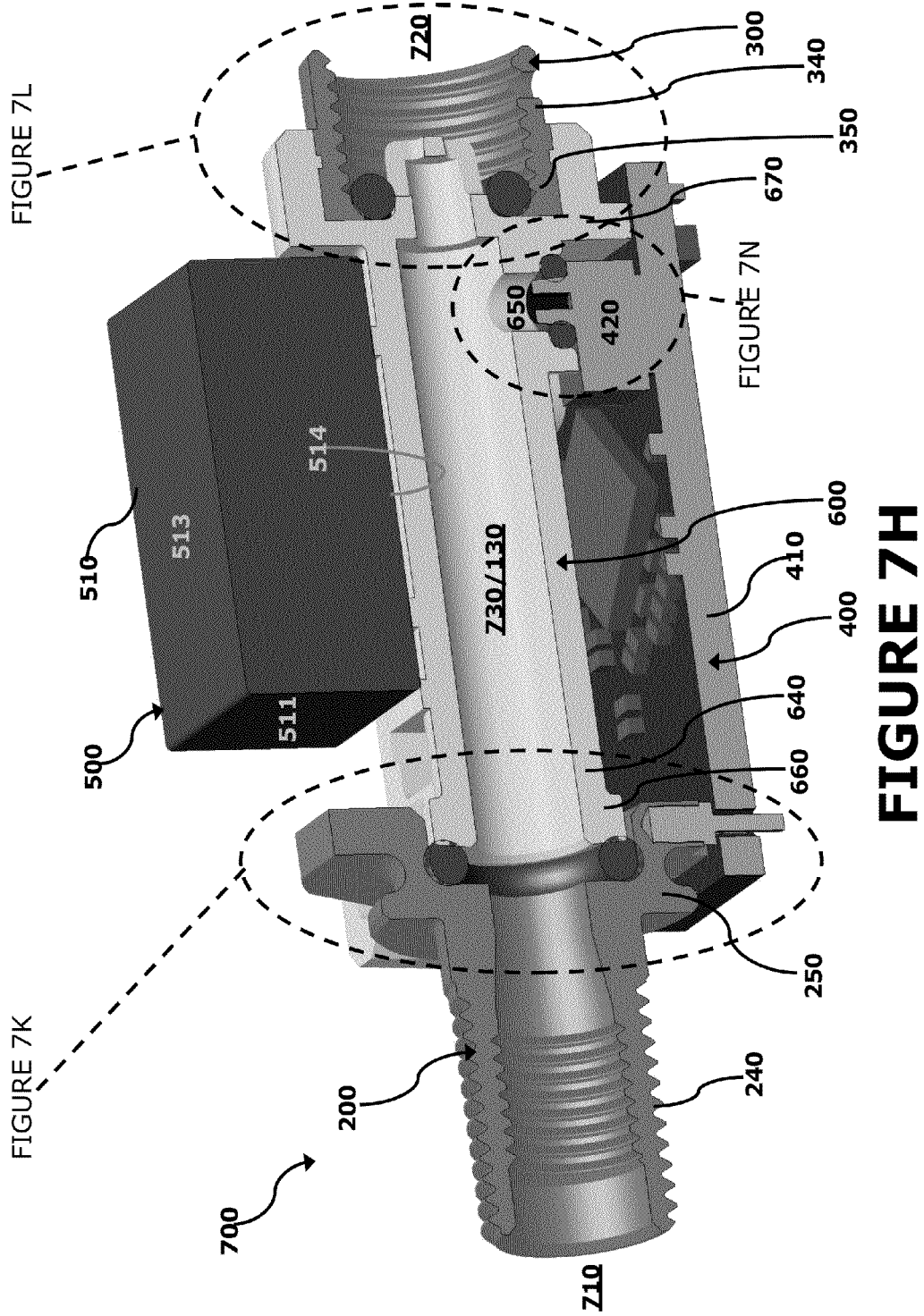
Figure 7I:
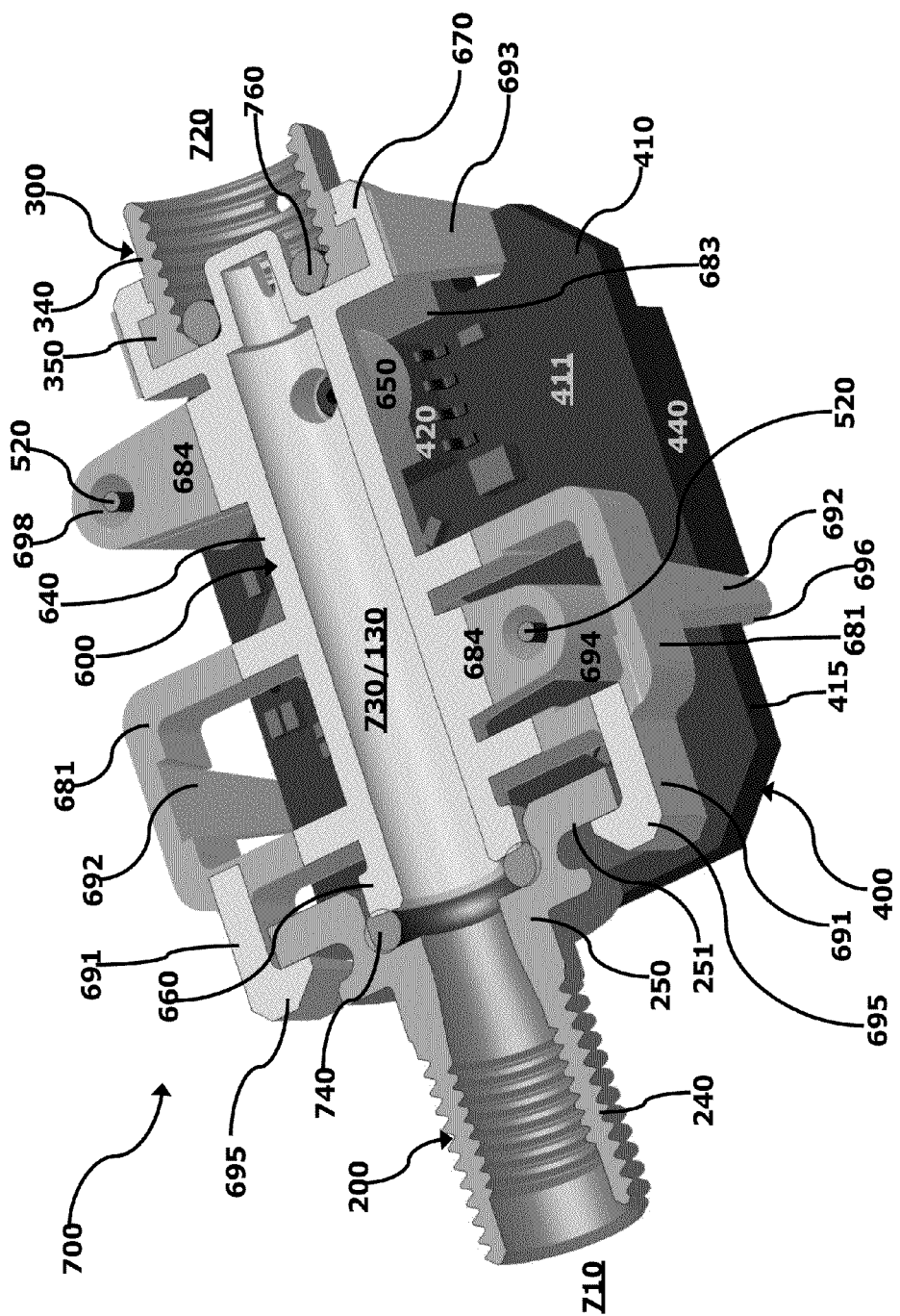
Figure 7J:
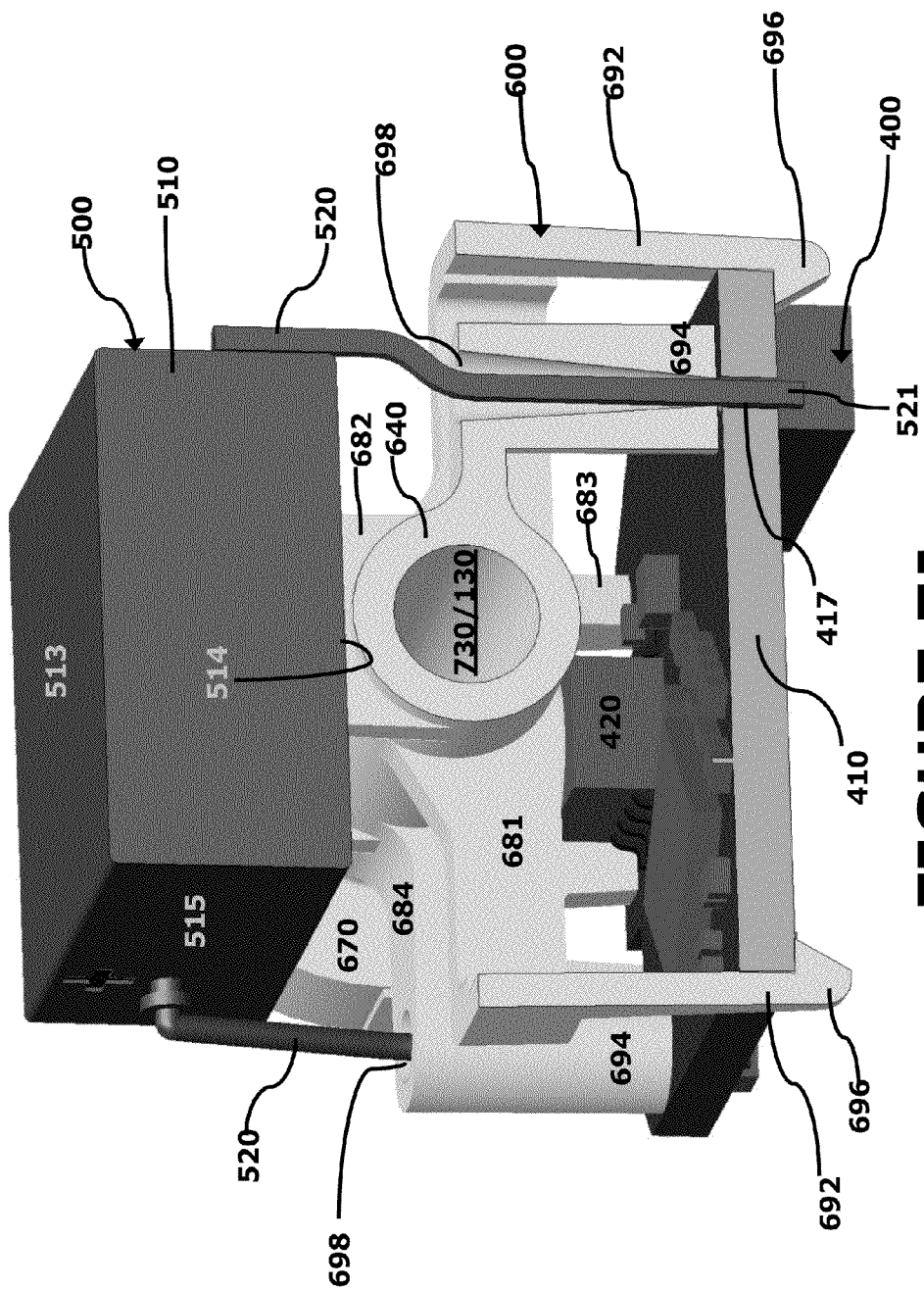
Figure 7L:
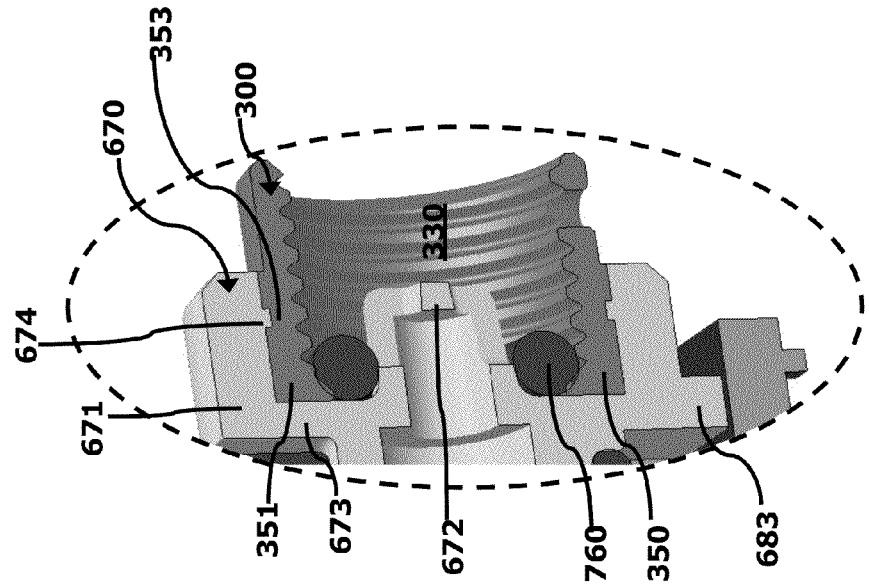
Figure 7K:
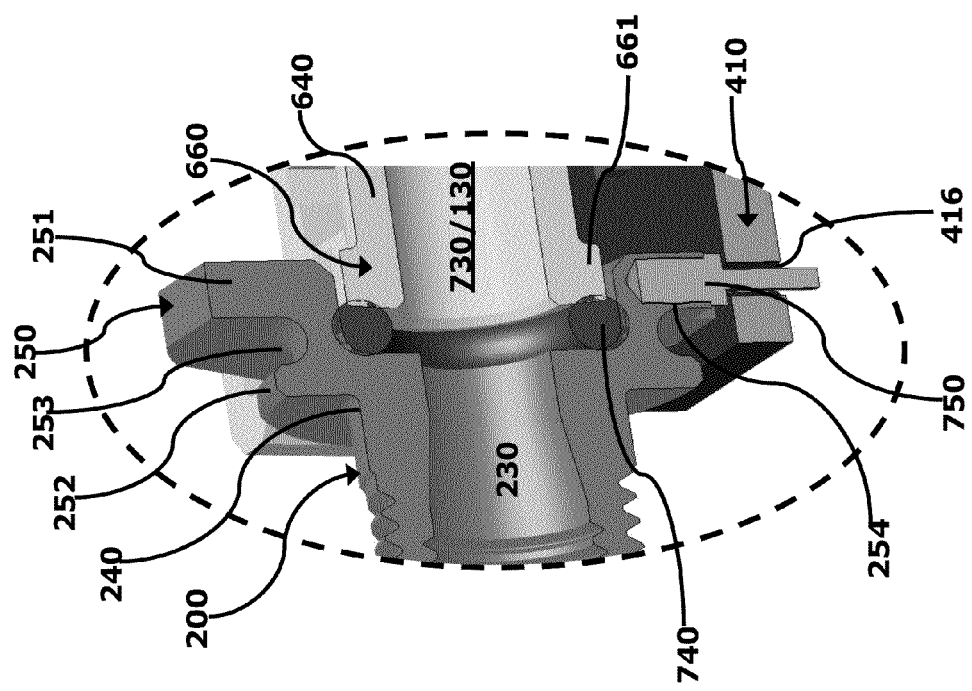
Figure 7N:
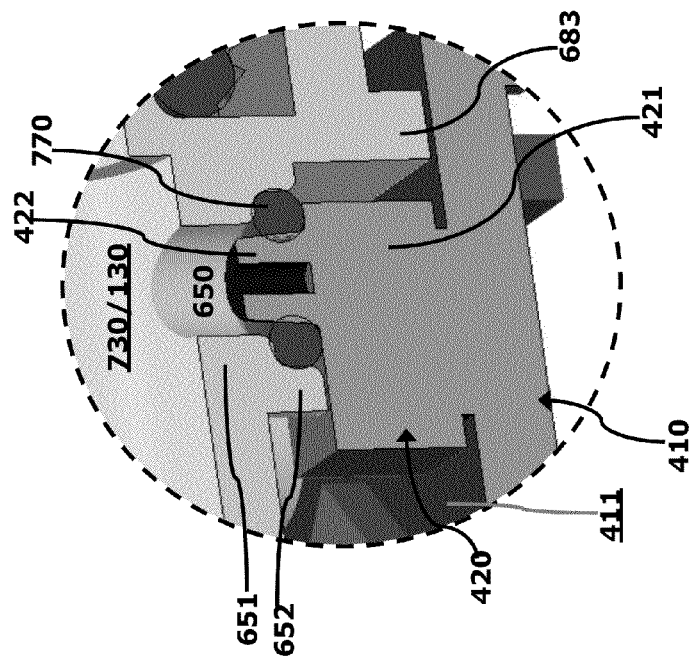

The brim 250 of the first fitting 200 is attached to the scaffoyer's collar 660. As is best seen by referring to the close-up view in FIG. 7K, the scaffoyer skirt 661 is situated just inside the brim's end flange 251 and an Oring 740 is sandwiched between it and the interior ledge formed by the brim's other flange 252. A conductive pin 750 has its head inserted within the bore 254 and its shank inserted into the hole 416 in the electronics substrate 410.

The first fitting 200 is also scaffolded to the scaffoyer 600 in the subassembly 700. Specifically, the arm-like derricks 691 reach around the brim 250 of the first fitting 200, and its hands 695 hook onto the end flange 251 to secure the fitting 200.

Figure 7M:
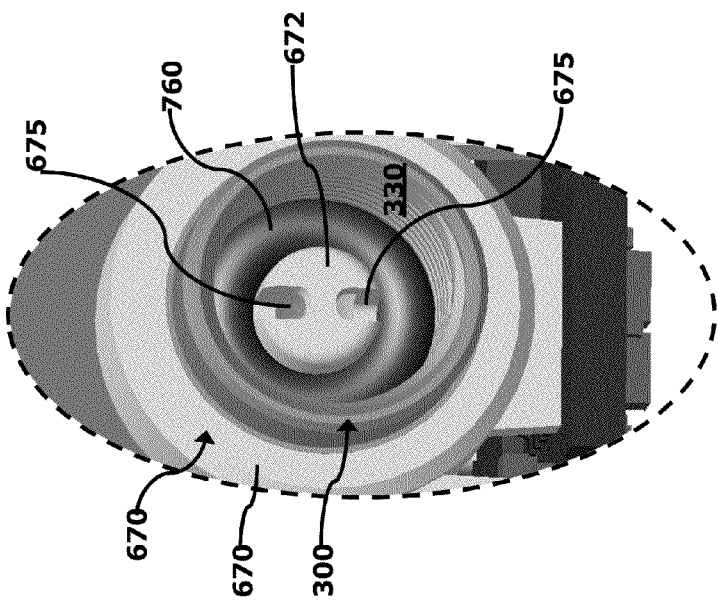
Figure 8A:
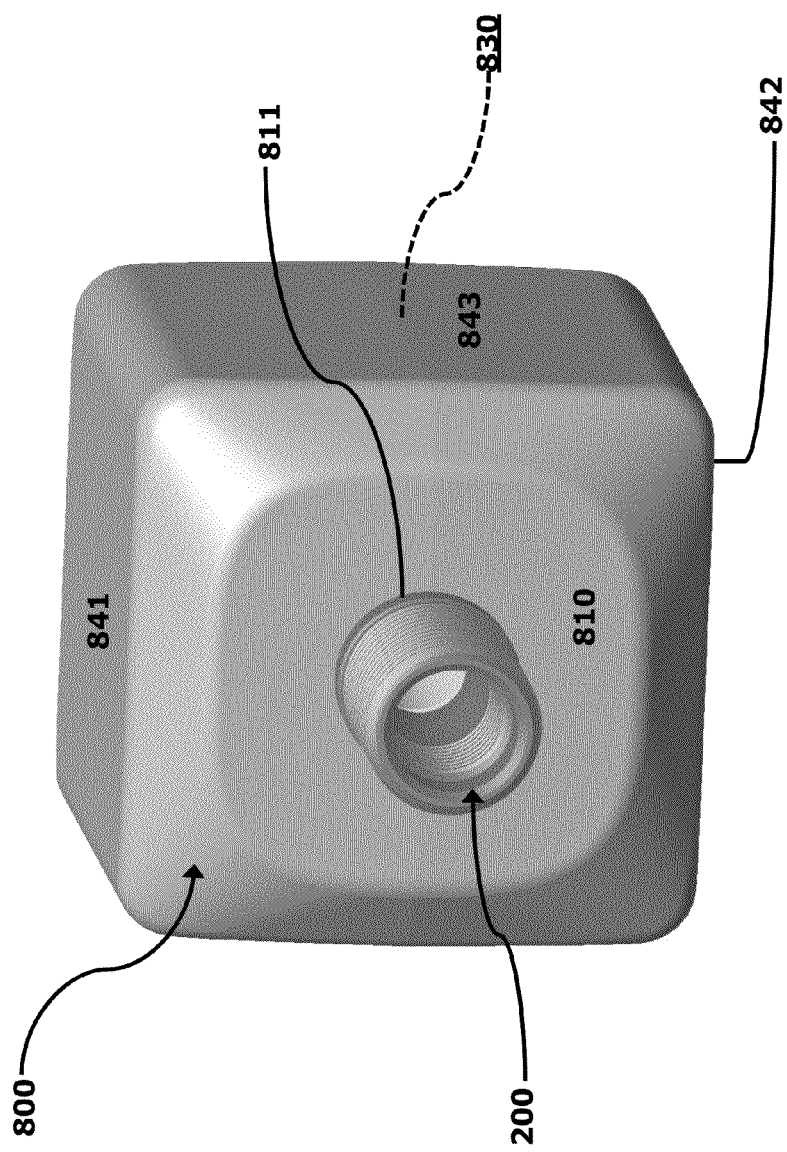
Figure 8B:
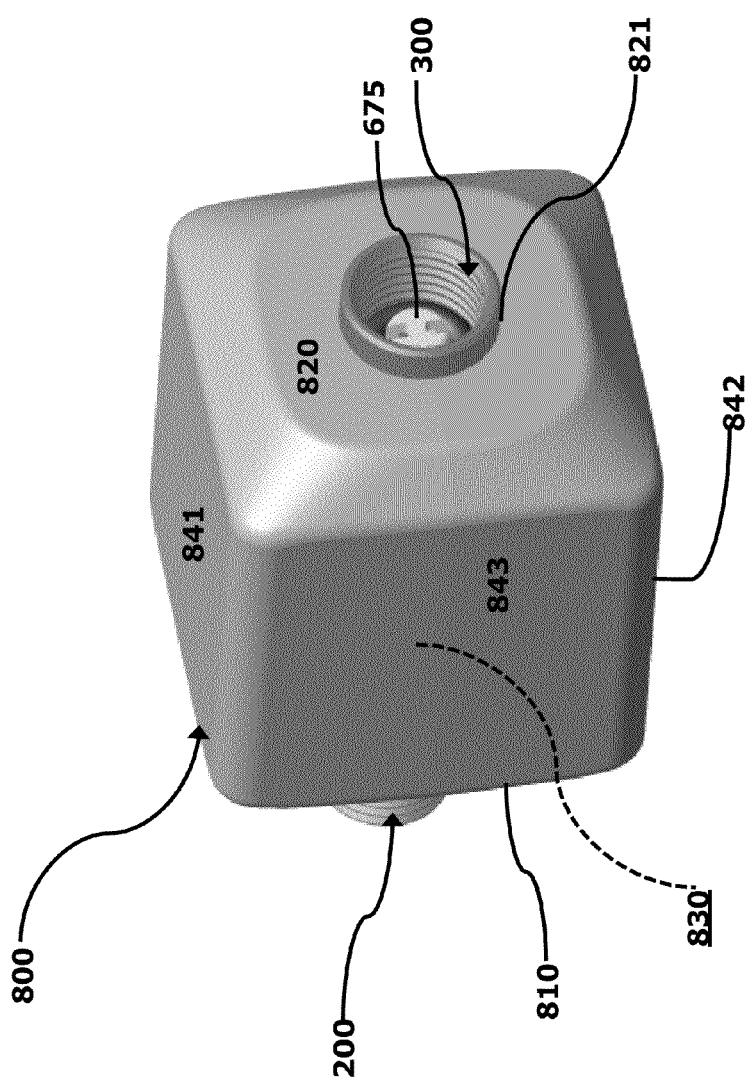
Figure 8C:
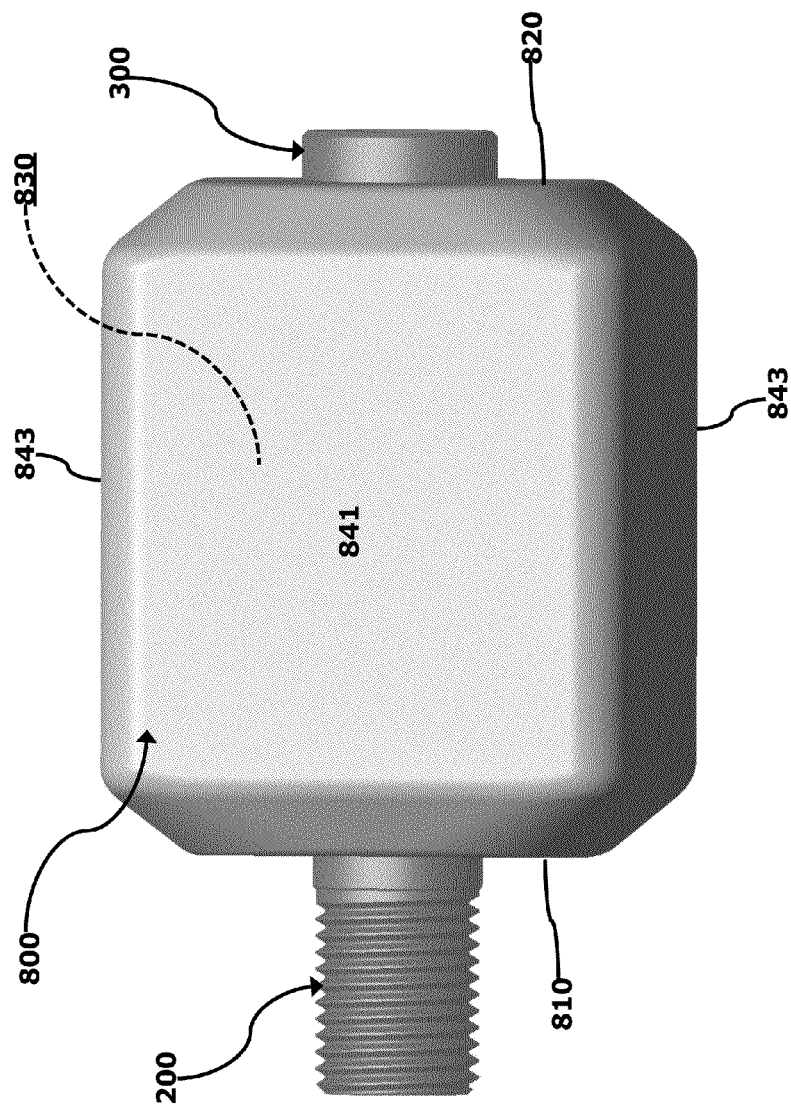
Figure 8D:
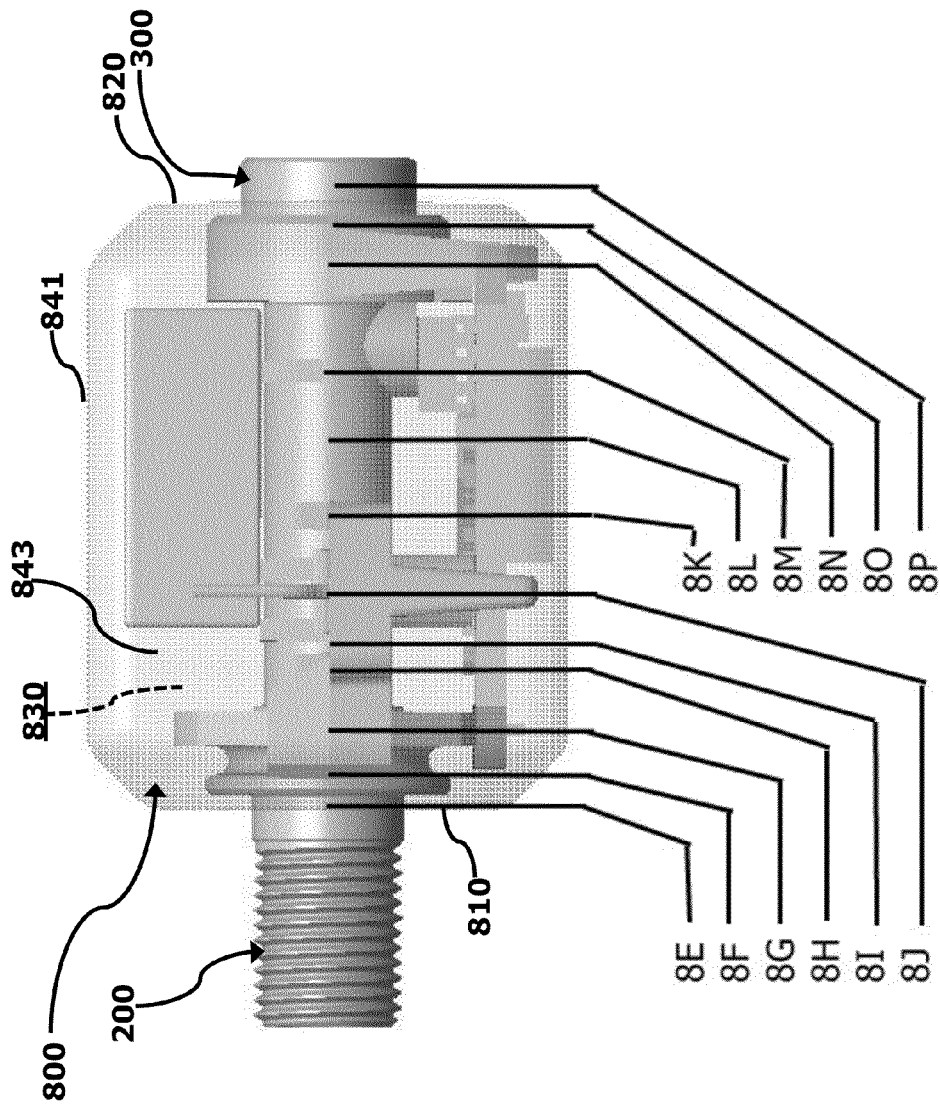

In the preferred cartridge-construction method, the scaffoyer 600 is formed (e.g., molded) around the second fitting 300, whereby it does not need scaffolding in the subassembly 700. As is best seen by referring to the close-up view in FIG. 7L, the scaffoyer's collar 670 surrounds the brim 350 of the fitting 300, with its lip 674 filling the notch 353. An Oring 760 is abutted axially against the collar's deck 673 and sandwiched radially between the dais 672 and the brim's flange 351. As is best seen by referring to the close-up view in FIG. 7M, the dais 672 extends into the fitting's threaded passageway 330 and the passageway 730/130 communicates therewith via the openings 675.

The substrate 410 of the electronics assembly 400 is scaffolded to the scaffoyer 600 in the subassembly 700. The hooked feet 696 of the leg-like derricks 692 grip the substrate's lateral edges 415 and the hooked feet 697 of the leg-like derricks 693 reside within the slots 418 and grip the substrate's second edge 414.

With the substrate 410 so scaffolded, the fluid-condition-ascertaining device 420 is in fluid communication with the channel 650 and thus the passageway 730/130. As is best seen by referring to the close-up view in FIG. 7N, the stack 422 is situated within the channel's widened hall 652. An Oring 770 is sandwiched therebetween to seal the interface.

Also with the substrate 410 so scaffolded, the panel-like plank 683 rests on the substrate's top surface 411. And the pedestal-like derricks 694 sit on the top surface 411 of the substrate 410, with their hollow conduits 698 vertically aligned with the holes 417 in the substrate 410.

The battery cell 510 of the power source 500 can also be scaffolded to the scaffoyer 600 in the subassembly 700. In the illustrated embodiment, the battery cell 510 dwells above the scaffoyer 600, with its bottom wall 514 resting on the roofs of the panel-like planks 682. This aligns the terminal strips 520 for travel downward through the conduits 698 in the pedestal-like derricks 694 so that their tails 521 project through the substrate holes 417.

The strips' tails 521 can be electrically connected (e.g., soldered) to the substrate 410 on its bottom surface 412.

Housing Capsule 800

FIGS. 8A-8P

The housing capsule 800 is preferably created in one-piece by molding, and more particularly, reaction injection molding of a thermosetting polymer. Additionally or alternatively, it is preferably made of an electrically nonconductive material to enhance the antenna attributes of the first fitting 200 and/or eliminate insulation concerns with the electrical components 400/500. Suitable thermosetting polymers include, for example, polyurethanes, polyesters, epoxy resins, and phenolics.

The capsule 800 comprises a first end wall 810, a second end wall 820, and a compartment 830 flanked thereby. Side walls (e.g., top wall 841, bottom wall 842, and lateral walls 843) extend between the end walls 820 and 830. The illustrated walls have roughly rectangular shapes whereby the capsule 800 has a generally cube-like or block-like geometry.

The first end wall 810 includes a window 811 into the compartment 830 and the second end wall 820 includes a window 812 into the compartment 830. The windows 811 and 821 accommodate the fittings 200 and 300, respectively, in the completed cartridge 100. More specifically, the fittings' non-brim regions project through these windows, while their brims 250/350 (and the rest of the cartridge 100) are encased in the capsule 800.

In preferred cartridge-construction steps, the housing capsule 800 is molded over the scaffoyer subassembly 700. Thus, the capsule 800 is preferably not produced as a separate piece or subassembly. And as is perhaps best explained by referring to FIGS. 8E-8P, the compartment 830 has a complex contour which not only envelopes the cartridge components, but also fills the gaps, crevices, pockets, and other voids thereamong.

Cartridge-Construction Method 900

FIGS. 9A-9G

A method 900 of constructing the cartridge 100 can generally comprise the steps of forming the scaffoyer 600, subassembling the scaffoyer subassembly 700, testing the scaffoyer subassembly 700, and creating the housing capsule 800.

Figure 9A:
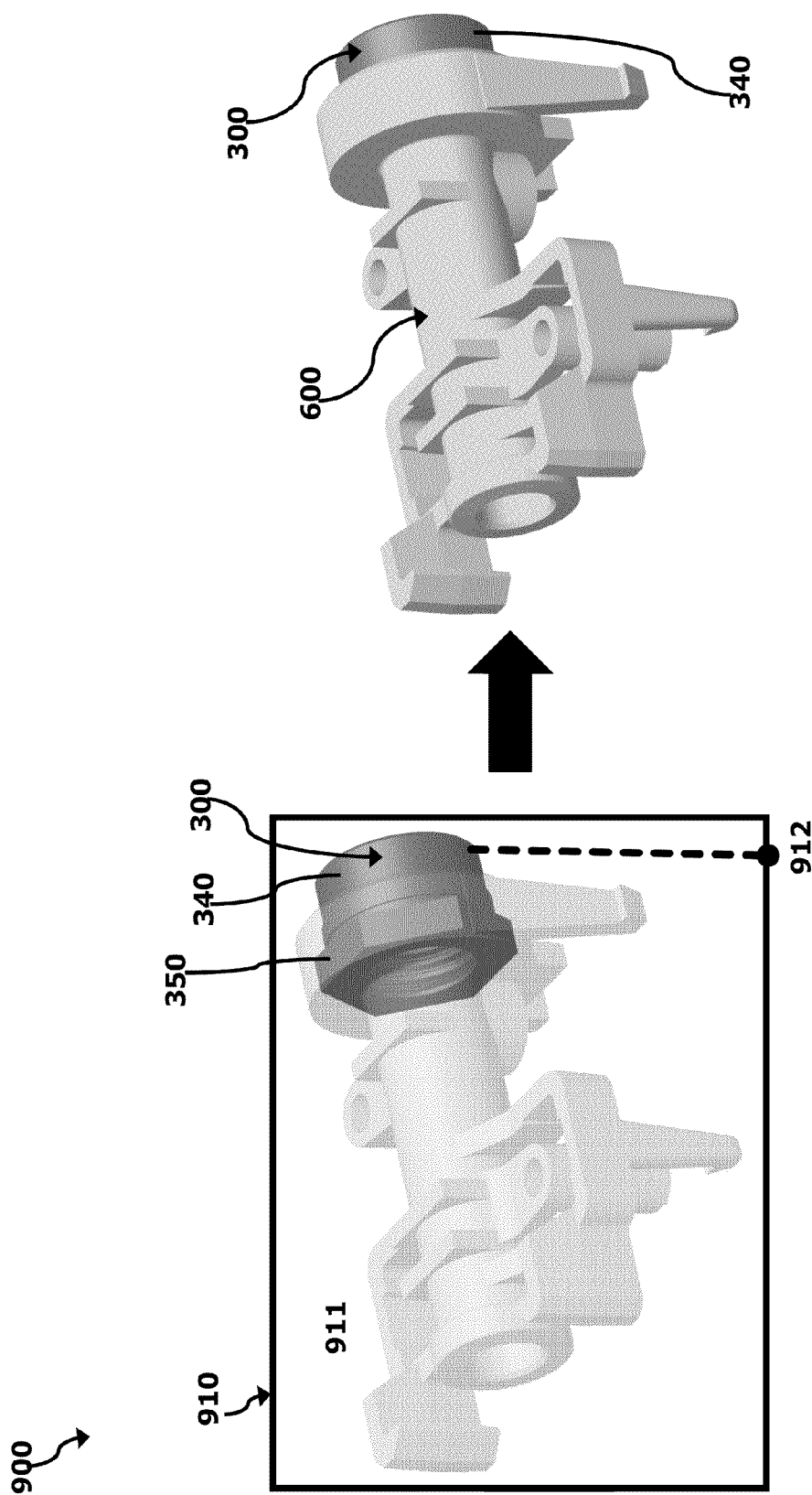

The scaffoyer-forming step can comprise molding the scaffoyer 600 in a mold 910 as shown in FIG. 9A. In the illustrated molding steps, the scaffoyer 600 is formed around the brim 350 of the second fitting. The mold 910 can have a cavity 911 shadowing the scaffoyer's profile. A posing feature 913 can be located outside the cavity 911 to coordinate with the posing feature 360 on the fitting's exposed cylindrical wall 340.

The subassembling steps generally involve attaching the non-capsule components of the cartridge 100 so that they are properly stanced mechanically, sincerely communicating fluidly, and correctly connected electrically.

Figure 9B:
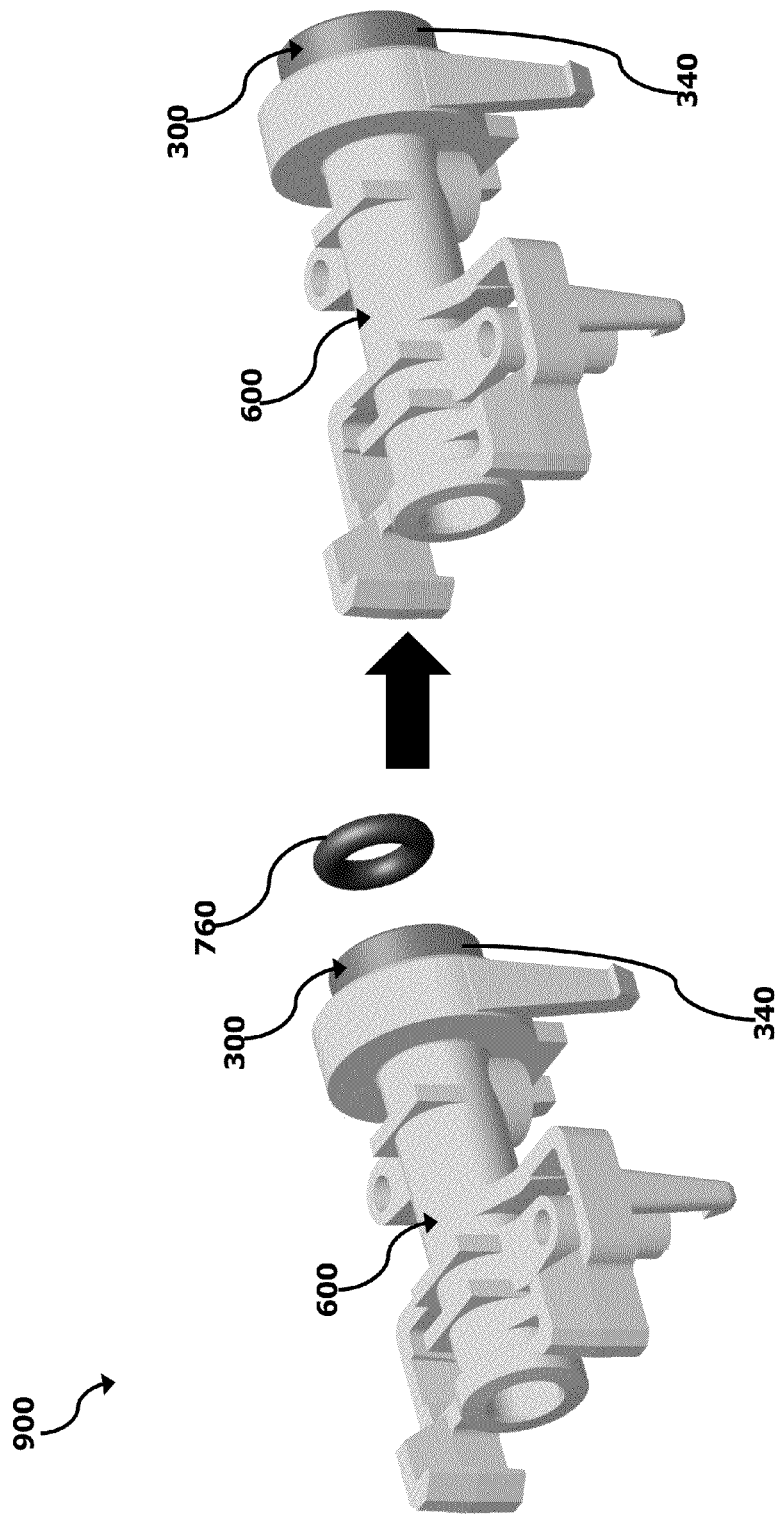

More specifically, for example, the subassembly-compiling steps can comprise inserting the Oring 760 into the passageway 330 of the second fitting 300 as shown in FIG. 9B.

Figure 9C:
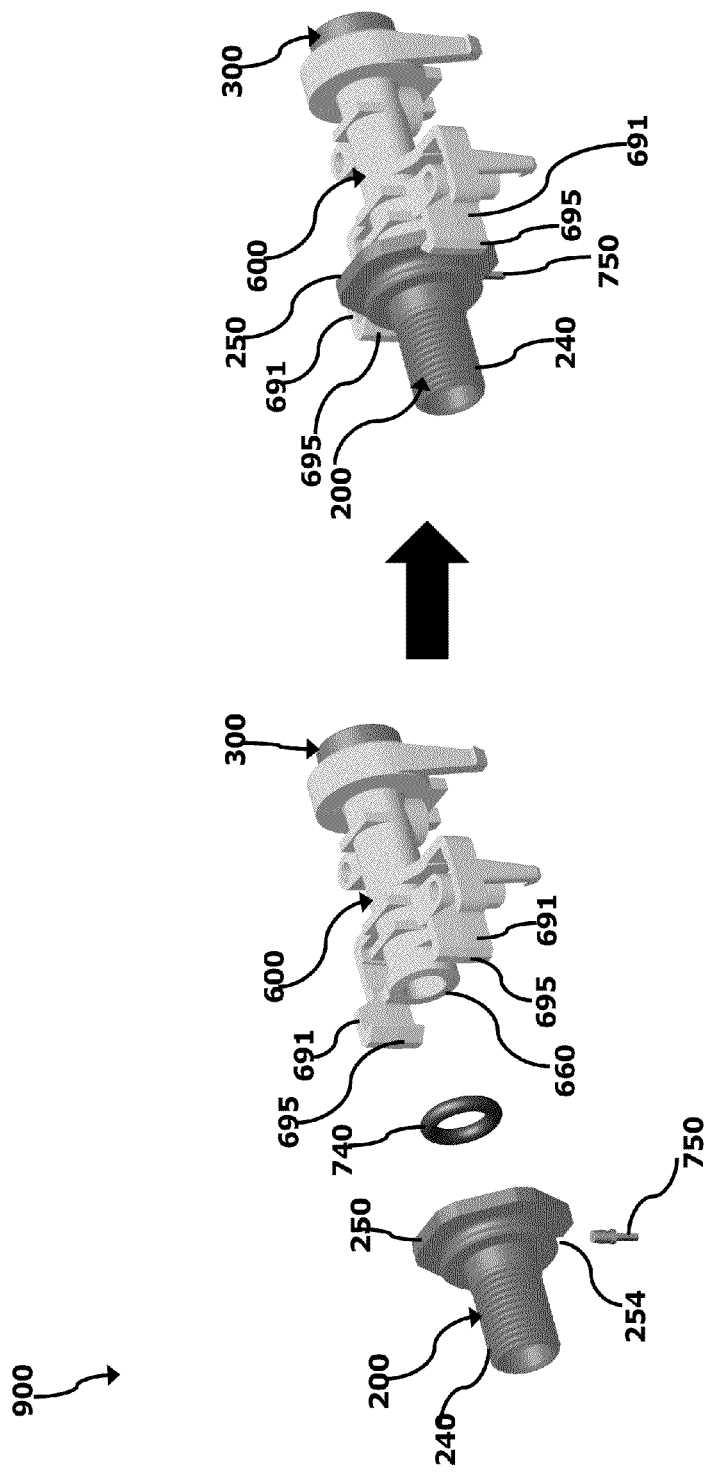

The subassembling steps can also comprise inserting the Oring 740 into the passageway 230 of the first fitting 200, electrically connecting the conductive pin 750 to the fitting 200, and fastening the fitting 200 to the scaffoyer 600, as shown in FIG. 9C. The pin-connecting step can comprise press-fitting into the bore 254 in the flange 251. The fastening step can include parking the fitting's brim 250 around the scaffoyer's collar 660 and/or gripping the brim 250 with the scaffoyer's arm-like derricks 691.

Figure 9D:
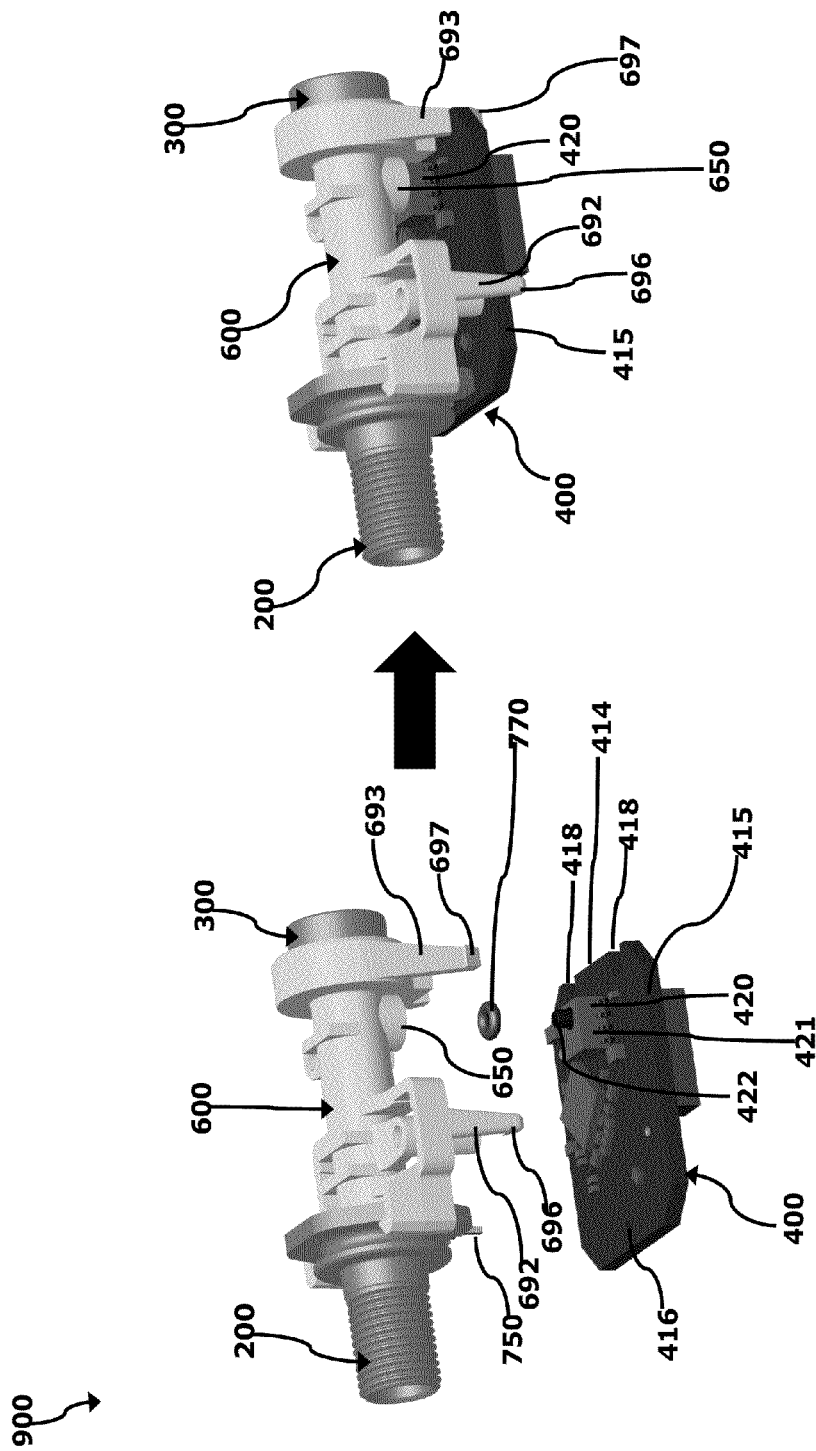

The subassembling steps can additionally include inserting the Oring 770 into the tap channel 650 and securing the electronics substrate 410 to the scaffoyer 600 as shown in FIG. 9D. The securing step can comprise grasping lateral edges 415 of the substrate 410 with the scaffoyer's leg-like derricks 692 and/or grasping the substrate's edge 414 with the leg-like derricks 693. With the illustrated securing steps, lower panel plank 683 abuts against the substrate's top surface 411, the conductive pin 750 travels into the substrate's opening 416, and the lower portions 782 of the conductive posts 780 pass through the substrate's openings 417.

Figure 9E:
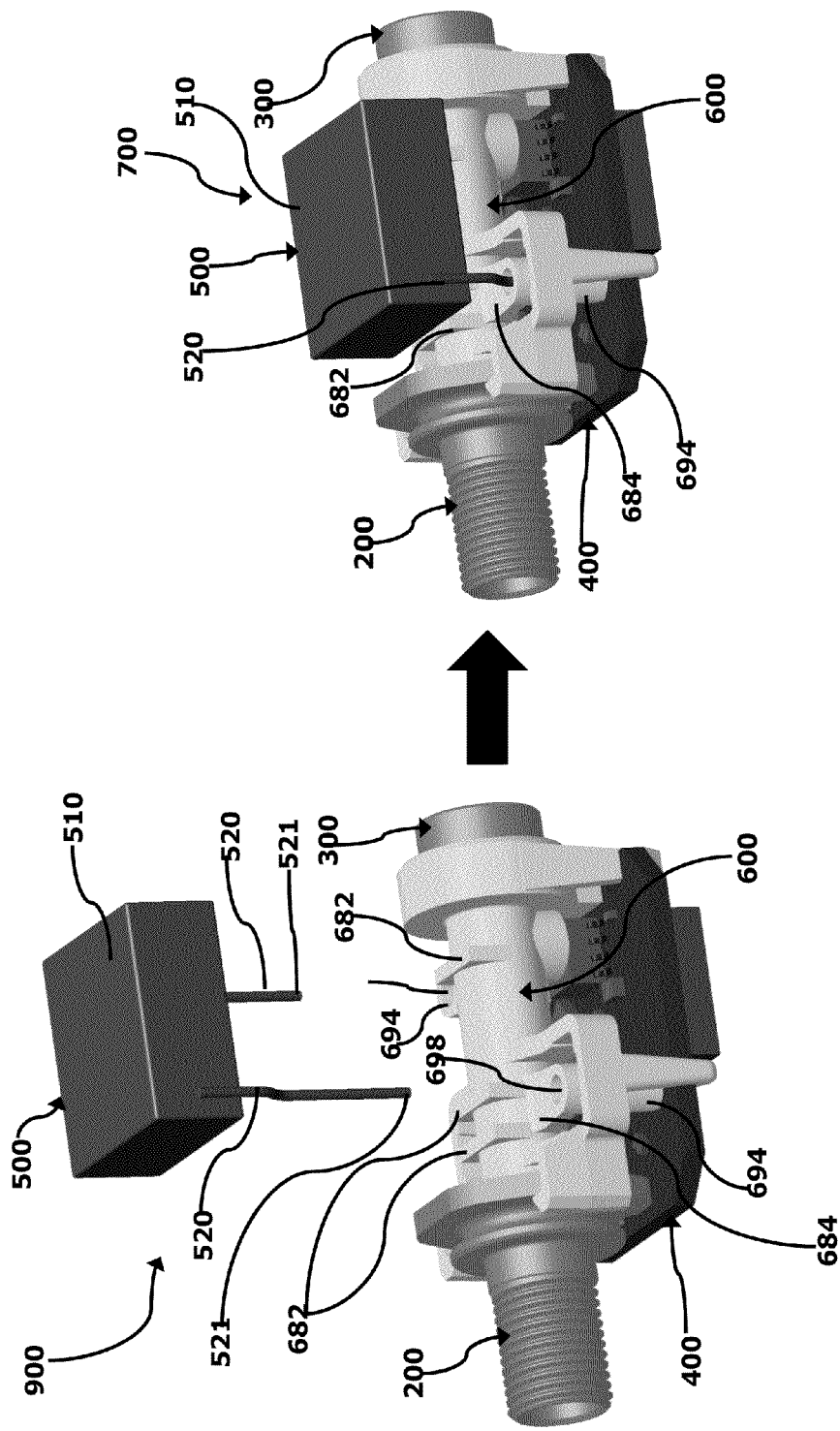

The subassembling steps can further comprise properly positioning the battery 510 and electrically connecting it to the electronic substrate as shown in FIG. 9E. The positioning step can comprise placing the battery 510 on top of the panel planks 682. The electrical-connection steps can comprise inserting the terminal strips 520 through the conduits 698 in the pedestal-like derricks 694 and into the holes 417 on the substrate 410. The tails 521 of the terminal strips 520 can then electrically connected (e.g., soldered) to the substrate's bottom surface 422.

Figure 9F:
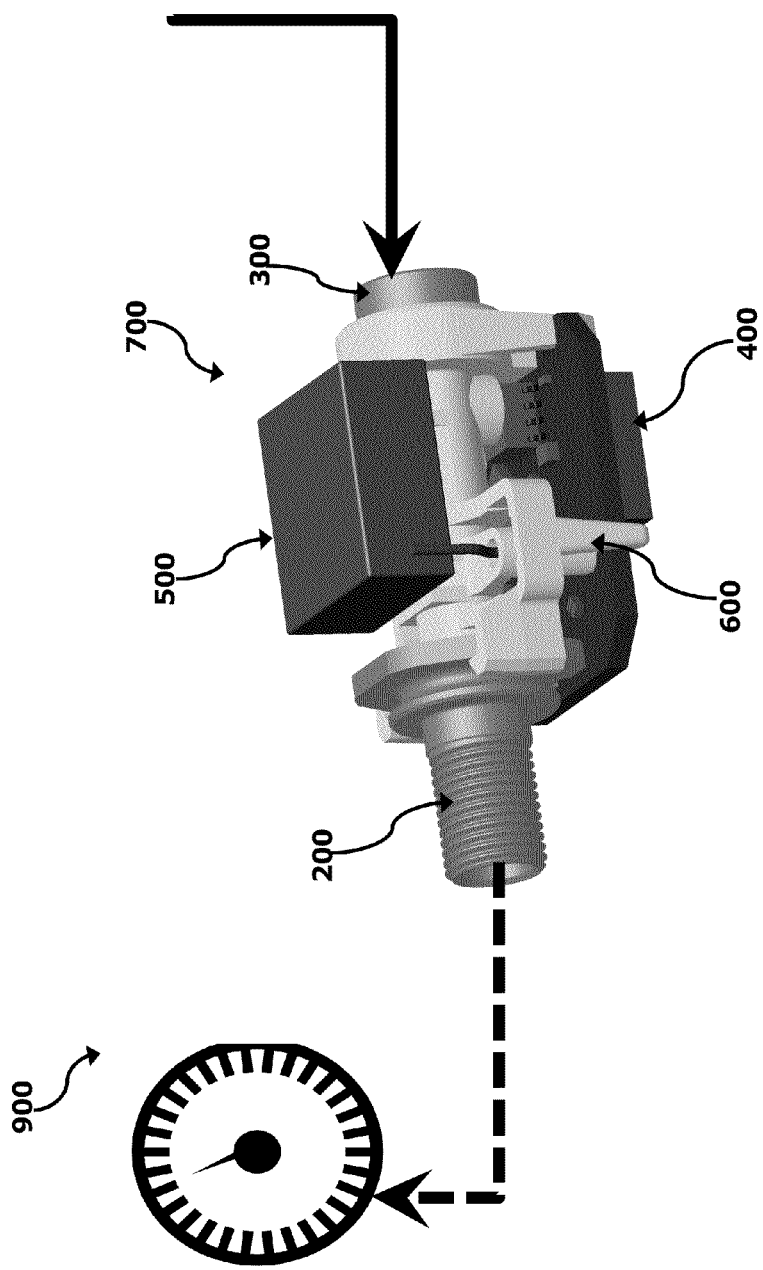

After completion of the subassembling steps, the scaffoyer subassembly 700 is tested as shown schematically in FIG. 9F. Specifically, the subassembly 700 can be tested for fluid integrity (e.g., leaks), electrical competence, condition-ascertaining accuracy, and/or antenna strength.

If issues arise during testing, they can still be addressed as the operational components are not yet encased in the housing 800. And if problems cannot be resolved, the more expensive cartridge components (e.g., the electrical substrate 410, the battery 510, etc.) can be salvaged and re-used.

Figure 9G:
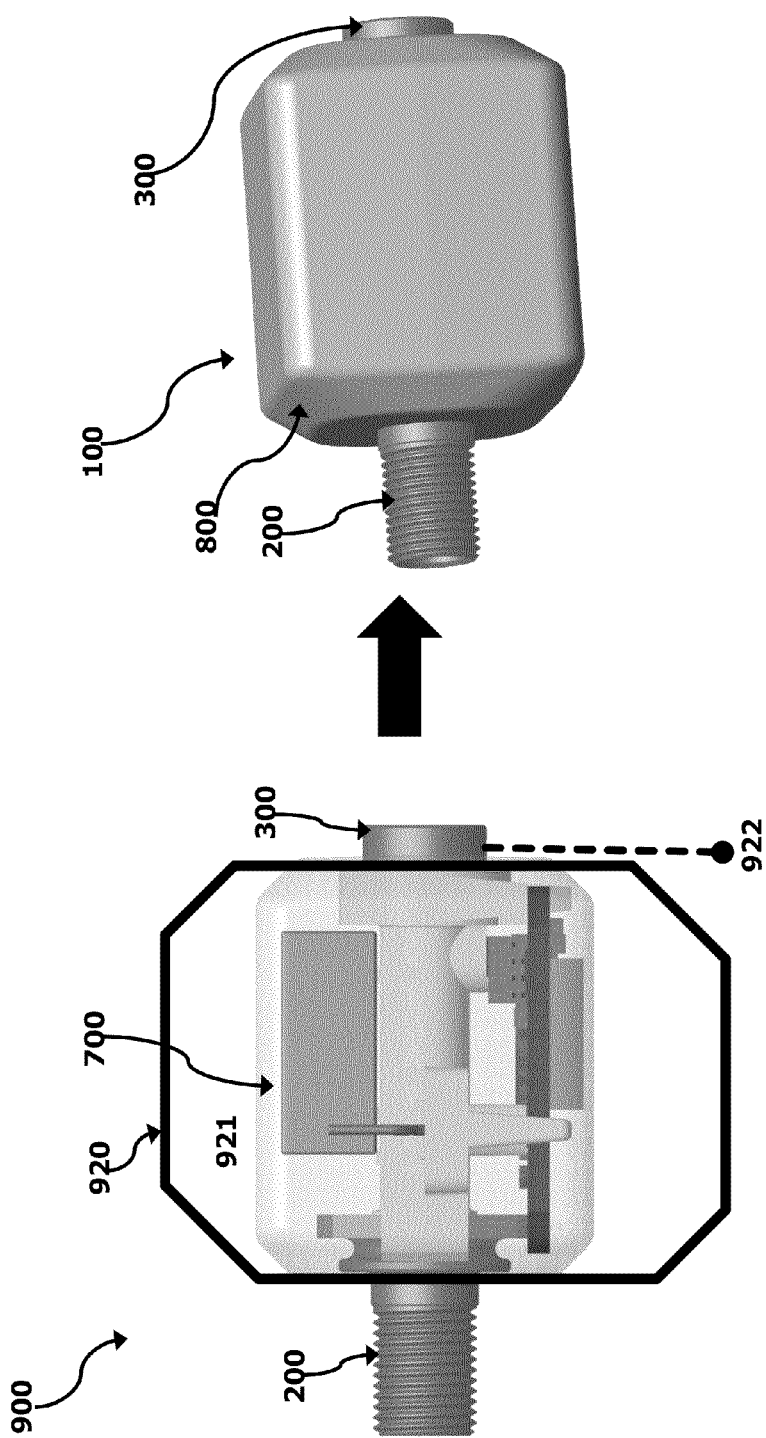

The capsule-creating steps can comprise molding the housing capsule 800 around the scaffoyer subassembly 700 as shown in FIG. 9G. The illustrated steps are performed in a mold 920 having a cavity 921 outlining the housing shape. The mold 920 can include a posing feature 922 located outside the cavity 921 to coordinate with the hole 360 in the second fitting 300.

The construction of the cartridge 100 can be substantially complete upon creation of the housing capsule 800.

Closing

One may now appreciate the cartridge 100 is both dependable and buildable in an economic manner. Although the vehicle 10, the wheel 20, the tire 30, the rim 40, the stem 50, the cartridge 100, the fitting 200, the fitting 300, the electronics assembly 400, the power source 500, the scaffoyer 600, the subassembly 700, the housing capsule 800, and/or the cartridge-construction process 900 have been shown and described with respect to preferred embodiments, other variations will occur to those skilled in the art upon reading this specification. While the specification has conversed chiefly about sensing tire pressures, the cartridge 100 could be used to determine additional and/or other parameters of the wheel 20 and/or the tire 30. Moreover, although the description was dedicated to a cartridge 100 for ascertaining tire conditions, its scaffoyer structure and/or construction process can be used in other sensing devices to obtain the same, similar, or analogous advantages.

The invention claimed is:

1. A scaffoyer, for a fluid-condition-ascertaining cartridge, said scaffoyer comprising:
a fluid foyer formed by a cylindrical wall and defining a first end and a second end;
a channel extending radially outward from the foyer-forming wall and communicating with the fluid foyer; and
scaffolding connected to the foyer-forming wall; wherein the scaffolding comprise scaffolding planks which extend radially outward from the foyer-forming wall, and wherein said scaffolding planks comprise:
planks that extend symmetrically from the foyer-forming wall; and/or
one or more planks that stand upward on the foyer-forming wall;
a plank that dives downward from the foyer-forming wall; and/or
planks that project outward from laterally opposed and longitudinally offset locations on the foyer-forming wall.

2. A scaffoyer as set forth in claim 1, wherein the foyer-forming wall, the channel, and the scaffolding are formed together in one piece.

3. A scaffoyer as set forth in claim 1, wherein the scaffolding comprise scaffolding derricks suspended from the foyer-forming wall and/or the scaffolding planks, and wherein the scaffolding derricks comprise:
derricks attached to the scaffolding planks and reaching distally therebeyond; and/or
derricks suspended from the scaffolding planks and/or the foyer-forming wall; and/or
derricks suspended from the scaffolding planks.

4. A scaffoyer as set forth in claim 3, wherein at least some of the scaffolding derricks have hooked hands/feet.

5. A scaffoyer as set forth in claim 1, wherein the foyer-forming wall comprises a first-fitting collar situated at the first end and a second-fitting collar situated at the second end.

6. A scaffoyer subassembly comprising:
a scaffoyer as set forth in claim 1, and
an electronics assembly which includes a condition-ascertaining device for ascertaining a condition of fluid;
wherein the channel is in fluid communication with the condition-ascertaining device, and wherein the scaffolding scaffolds components of the electronics assembly.

7. A cartridge comprising the scaffoyer subassembly set forth in claim 6, wherein the cartridge has a first end, a second end, and a fluid passage extending therebetween; and wherein the fluid foyer defines at least part of the fluid passage.

8. A cartridge as set forth in claim 7, further comprising a first fitting having a distal end, a scaffoyer-proximate end and a passageway extending therebetween, wherein the first fitting is electrically connected to the electronics assembly, and wherein the first fitting functions as an antenna for conveying electrical signals produced by the condition-ascertaining device to a remote location.

9. A cartridge as set forth in claim 8, further comprising a second fitting having a distal end, a scaffoyer-proximate end, and a passageway therebetween, and wherein its scaffoyer-proximate end includes a brim attached to a second-fitting collar of the scaffoyer.

10. A cartridge as set forth in claim 7, wherein the condition-ascertaining device is adapted to ascertain a pressure of a gas fluid.

11. A cartridge as set forth in claim 7, wherein the electronics assembly includes a transmitter for conveying electrical signals from the condition-ascertaining device to a remote location, wherein the transmitter is lodged on a substrate including a printed circuit board, and wherein the scaffolding scaffolds the substrate.

12. A cartridge as set forth in claim 7, further comprising a power source for powering the electronics assembly, wherein the power source comprises a battery cell, and wherein the scaffolding scaffolds the battery cell.

13. A cartridge comprising a scaffoyer, an electronics assembly which includes a condition-ascertaining device for ascertaining a condition of fluid, and a housing capsule which houses the scaffoyer and the electronics assembly, wherein:
the scaffoyer comprises a fluid foyer formed by a cylindrical wall and defining a first end and a second end, a channel extending radially outward from the foyer-forming wall and communicating with the fluid foyer, and scaffolding connected to the foyer-forming wall;

the channel is in fluid communication with the condition-ascertaining device, and wherein the scaffolding scaffolds components of the electronics assembly;

the cartridge has a first end, a second end, and a fluid passage extending therebetween; and wherein the fluid foyer defines at least part of the fluid passage; and the housing capsule is molded around the electronics assembly and the scaffoyer.

14. A cartridge as set forth in claim 13, wherein the housing capsule is made from a thermoset polymer.

15. A method of constructing the cartridge set forth in claim 13, comprising the steps of:

subassembling a subassembly comprising the scaffoyer and the electronics assembly scaffolded thereto; and creating the housing capsule around the subassembly.

16. A method as set forth in claim 15, further comprising the step of testing fluid integrity, testing the electrical connectivity, testing the condition-ascertaining accuracy, and/or testing the antenna-strength prior to said capsule-creating step.

17. A wheel comprising an inflation chamber and the fluid-condition-ascertaining cartridge set forth in claim 7 mounted thereto ascertain a condition of fluid within the inflation chamber.

18. A vehicle comprising a plurality of wheels each of the wheels comprising an inflation chamber and the fluid-condition-ascertaining cartridge set forth in claim 7 mounted thereto ascertain a condition of fluid within the inflation chamber.

19. A cartridge having a first end, a second end, and a fluid passage extending therebetween; said cartridge comprising:

a fluid foyer formed by a cylindrical wall, wherein the fluid foyer defines at least part of the fluid passage and wherein a channel extends radially outward from the cylindrical wall and communicates with the fluid foyer;

an electronics assembly which includes a condition-ascertaining device for ascertaining a condition of fluid, wherein the channel is in fluid communication with the condition-ascertaining device, scaffolding connected to the foyer-forming wall, wherein the scaffolding scaffolds components of the electronics assembly; and a housing capsule molded around the fluid foyer, the electronics assembly, and the scaffolding.

20. A cartridge as set forth in claim 19, further comprising a fitting having a passageway which communicates with the passage, wherein the fitting is electrically connected to the electronics assembly, and wherein the fitting functions as an antenna for conveying electrical signals produced by the condition-ascertaining device to a remote location.

* * * * *

UNITED STATES PATENT AND TRADEMARK OFFICE
CERTIFICATE OF CORRECTION

PATENT NO. : 8,881,586 B2
APPLICATION NO. : 13/662285
DATED : November 11, 2014
INVENTOR(S) : Gary Steven Rothstein et al.

It is certified that error appears in the above-identified patent and that said Letters Patent is hereby corrected as shown below:

Title Page, insert item (60), Related U.S. Application Data:
--Provisional application No.: 61/552,439, filed Oct. 27, 2011 and Provisional application No.: 61/600,713, filed Feb. 20, 2012--

Signed and Sealed this
Tenth Day of March, 2015

Michelle K. Lee
*Deputy Director of the United States Patent and Trademark Office*